US009496547B2

(12) United States Patent
Tsai et al.

(10) Patent No.: US 9,496,547 B2
(45) Date of Patent: *Nov. 15, 2016

(54) COMPOSITE ELECTRODE MATERIAL OF LITHIUM SECONDARY BATTERY AND LITHIUM SECONDARY BATTERY

(71) Applicant: Industrial Technology Research Institute, Hsinchu (TW)

(72) Inventors: Li-Duan Tsai, Hsinchu (TW); Yueh-Wei Lin, Hsinchu (TW); (Continued)

(73) Assignee: Industrial Technology Research Institute, Hsinchu (TW)

( * ) Notice: Subject to any disclaimer, the term of this patent is extended or adjusted under 35 U.S.C. 154(b) by 453 days.

This patent is subject to a terminal disclaimer.

(21) Appl. No.: 13/910,140

(22) Filed: Jun. 5, 2013

(65) Prior Publication Data

US 2014/0178747 A1    Jun. 26, 2014

(30) Foreign Application Priority Data

Dec. 25, 2012   (TW) ............................. 101149882 A

(51) Int. Cl.
*H01M 4/36* (2006.01)
*H01M 4/38* (2006.01)
(Continued)

(52) U.S. Cl.
CPC ............... *H01M 4/366* (2013.01); *H01M 4/38* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2010/0167129 A1* 7/2010 Wu et al. ................ 429/231.95
2011/0236299 A1    9/2011 Gao et al.
2012/0107699 A1    5/2012 Yamaki

FOREIGN PATENT DOCUMENTS

CN    101212065    7/2008
CN    102468515    5/2012
(Continued)

OTHER PUBLICATIONS

"Office Action of Taiwan Counterpart Application", issued on Jun. 12, 2014, p. 1-p. 6.
(Continued)

*Primary Examiner* — Carlos Barcena
*Assistant Examiner* — Wojciech Haske
(74) *Attorney, Agent, or Firm* — Jianq Chyun IP Office

(57) ABSTRACT

A composite electrode material of a lithium secondary battery and a lithium secondary battery are provided. The composite electrode material of the lithium secondary battery at least includes an electrode active powder and a nanoscale coating layer coated on the surface of the electrode active powder, wherein the nanoscale coating layer is composed of a metastable state polymer, a compound A, a compound B, or a combination thereof. The compound A is a monomer having a reactive terminal functional group, and the compound B is a heterocyclic amino aromatic derivative used as an initiator. The weight ratio of the nanoscale coating layer to the composite electrode material of the lithium secondary battery is 0.005% to 10%.

23 Claims, 20 Drawing Sheets

(72) Inventors: Chia-Chen Fang, Taipei (TW);
Wei-Hsin Wu, Kaohsiung (TW);
Deng-Tswen Shieh, Hsinchu (TW)

(51) Int. Cl.
*H01M 4/505* (2010.01)
*H01M 4/525* (2010.01)
*H01M 4/58* (2010.01)
*H01M 4/583* (2010.01)

(52) U.S. Cl.
CPC ........... *H01M 4/583* (2013.01); *H01M 4/5825* (2013.01); *Y02E 60/122* (2013.01)

(56) References Cited

FOREIGN PATENT DOCUMENTS

| | | |
|---|---|---|
| JP | 2013069672 | 4/2013 |
| KR | 100368752 | 1/2003 |
| TW | 201218491 | 5/2012 |
| TW | 201222949 | 6/2012 |
| TW | 201226435 | 7/2012 |
| TW | 201230471 | 7/2012 |
| TW | 201248969 | 12/2012 |

OTHER PUBLICATIONS

Kuo-Feng Chiu, et al., "Pulsed plasma induced protection coatings on composite LiMn2O4 powder cathodes", Surface & Coatings Technology, Mar. 24, 2012, pp. 1-4.

Jang-Hoon Park, et al., "A novel ion-conductive protection skin based on polyimide gel polymer electrolyte: application to nanoscale coating layer of high voltage LiNi1/3Co1/3Mn1/3O2 cathode materials for lithium-ion batteries", Journal of Materials Chemistry, vol. 22, May 2012, pp. 12574-12581.

Guiying Zhao, et al., "Enhanced rate and high-temperature performance of La0.7Sr0.3MnO3-coated LiNi0.5Mn1.5O4 cathode materials for lithium ion battery", Journal of Power Sources, vol. 215, May 2012, pp. 63-68.

Jin-Hwa Kim, et al., "Effect of aluminum fluoride coating on the electrochemical and thermal properties of 0.5Li2MnO3-0.5LiNi0.5Co0.2Mn0.3O2 composite material", Journal of Alloys and Compounds, vol. 517, Dec. 2012, pp. 20-25.

Yong-Qing Wang, et al., "Rutile-TiO2 Nanocoating for a High-Rate Li4Ti5O12 Anode of a Lithium-Ion Battery", Journal of the American Chemical Society, vol. 134, May 2012, pp. 7874-7879.

Hyun-Soo Kim, et al., "Effect of carbon coating on LiNi1/3Mn1/3Co1/3O2 cathode material for lithium secondary batteries", Journal of Power Sources, vol. 171, Jun. 2007, pp. 917-921.

"Office Action of Korean Counterpart Application," issued on Jul. 30, 2015, with English translation thereof, p. 1-p. 25.

"Office Action of China Counterpart Application," issued on Sep. 1, 2015, p. 1-p. 8.

\* cited by examiner

COMPOSITE ELECTRODE MATERIAL OF LITHIUM SECONDARY BATTERY AND LITHIUM SECONDARY BATTERY

CROSS-REFERENCE TO RELATED APPLICATION

This application claims the priority benefit of Taiwan application serial no. 101149882, filed on Dec. 25, 2012. The entirety of the above-mentioned patent application is hereby incorporated by reference herein and made a part of this specification.

TECHNICAL FIELD

The disclosure relates to a composite electrode material of a lithium secondary battery and a lithium secondary battery.

BACKGROUND

The lithium secondary battery, due to advantages of high energy density, high operating voltage, low self-discharge rate, and long storage life, has become a battery system that has gained a lot of attention in recent years. The lithium secondary battery is widely used in portable electronic application products such as mobile phones, tablet PCs, and digital cameras. Early lithium batteries used lithium metals for anodes, intercalation compounds composed of transition metal oxides for cathodes (such as $Li_xCoO_2$ and $Li_xMnO_2$), and non-aqueous organic electrolyte solutions containing lithium ions for electrolytes. After the battery is discharged a plurality of times, dendritic crystals are easily formed on the anode of the battery, causing the separator used to separate the cathode and anode materials to become easily punctured, which may lead to a short circuit. Moreover, the battery will heat up faster, causing a decomposition reaction of the electrolyte solution and the cathode material, which in turn causes dangers such as fire and explosion.

Therefore, the electrode surface of the lithium secondary battery needs to have a protective layer to prevent direct contact with the electrolyte solution and to suppress delithiation of the electrode and side reactions of the electrolyte solution. In the techniques of the prior art, the categories of the protective layer of the cathode surface are metal (such as Ag), metal oxide (such as $Al_2O_3$ and $ZrO_2$), metal fluoride (such as $AlF_3$ and $ZrF_2$), and a plurality of carbon composites (such as graphene). An organic material is coated on the surface of the cathode in all of the categories. Moreover, the fabrication process of the coating is complex, and the cost is high. It is acquired that, the desired protective layer of the electrode surface of the lithium secondary battery not only needs to facilitate electrochemical property and thermal stability, but also needs to improve the cycle life of the battery at high temperature. Moreover, the fabrication process needs to be simplified to reduce costs.

SUMMARY

The disclosure provides a composite electrode material of a lithium secondary battery. The composite electrode material includes an electrode active powder and a nanoscale coating layer coated on a surface of the electrode active powder, wherein the nanoscale coating layer is composed of a metastable state polymer, a compound A, a compound B, or a combination thereof. The compound A is a monomer having a reactive terminal functional group, and the compound B is a heterocyclic amino aromatic derivative used as an initiator. The weight ratio of the nanoscale coating layer to the composite electrode material of the lithium secondary battery is 0.005% to 10%.

The disclosure also provides a composite electrode material of a lithium secondary battery. The composite electrode material includes an electrode plate composed of an electrode active powder, and a first nanoscale coating layer coated on a surface of the electrode plate, wherein the first nanoscale coating layer is composed of a first metastable state polymer, a compound A, a compound B, or a combination thereof. The compound A is a monomer having a reactive terminal functional group, and the compound B is a heterocyclic amino aromatic derivative used as an initiator. The weight ratio of the first nanoscale coating layer to the composite electrode material of the lithium secondary battery is 0.005% to 10%.

The disclosure also provides a lithium secondary battery. The lithium secondary battery at least includes at least one electrode material, a non-aqueous electrode solution, and a separator. The electrode material is the composite electrode material of the lithium secondary battery above. The non-aqueous electrolyte solution is in contact with the electrode material, wherein the non-aqueous electrolyte solution includes a non-aqueous solvent and lithium salt. The separator is located in the non-aqueous electrolyte solution.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
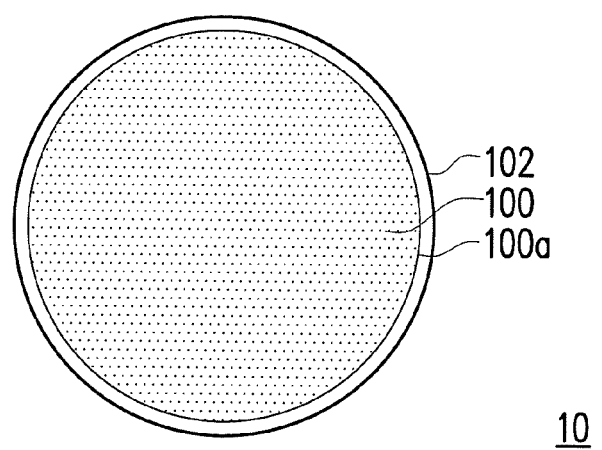
FIG. 1 is a cross-sectional schematic diagram of a composite electrode material of a lithium secondary battery according to the first exemplary embodiment of the disclosure.

FIG. 1 is a cross-sectional schematic diagram of a composite electrode material of a lithium secondary battery according to the first exemplary embodiment of the disclosure.

Referring to FIG. 1, the composite electrode material of the lithium secondary battery 10 includes an electrode active powder 100 and a nanoscale coating layer 102 coated on a surface 100a of the electrode active powder 100. In particular, the nanoscale coating layer 102 is formed from a metastable state polymer, a compound A, a compound B, or a combination thereof. Specifically, the compound A is a monomer having a reactive terminal functional group, and the compound B is a heterocyclic amino aromatic derivative used as an initiator. Moreover, the weight ratio of the nanoscale coating layer 102 to the composite electrode material of the lithium secondary battery 10 is 0.005% to 10%. Although FIG. 1 only illustrates one grain of the electrode active powder 100, it should be apparent to one skilled in the art that the electrode material of the lithium secondary battery is usually made of a plurality of powder grains. In the present embodiment, the electrode active powder 100 may be a cathode material or an anode material with a thickness between 1 nm and 30 nm. If the electrode active powder 100 is used as the cathode material, the electrode active powder 100 may be selected from the group consisting of lithiated oxide, lithiated sulfide, lithiated selenide, lithiated telluride of vanadium, titanium, chromium, copper, molybdenum, niobium, iron, nickel, cobalt, and manganese, and a combination thereof. Specifically, the electrode active powder 100 may be $LiMn_2O_4$, $LiNi_xCo_yO_2$, $LiCoO_2$, $LiFePO_4$, $LiNiXo_yMn_zO_2$, or $LiNi_xMn_yO_2$. When the cathode is discharging, lithium ions are inserted in the cathode material. When the cathode is charging, lithium ions are extracted. If the electrode active powder 100 is used as the anode material, then the electrode active powder 100 may be selected from the group consisting of mesocarbon microbeads (MCMB), mesophase graphite powder (MGP), vapor-grown carbon fiber (VGCF), carbon nanotube (CNT), coke, carbon black, natural graphite, artificial graphite, acetylene black, carbon fiber, glassy carbon, a lithium alloy, and a combination thereof. The anode selected from the metal group is, for instance, Al, Zn, Bi, Cd, Sb, Si, Pb, Sn, $Li_3FeN_2$, $Li_{2.6}Co_{0.4}N$, $Li_{2.6}Cu_{0.4}N$, or a combination thereof. The anode plate may further be a metal oxide such as SnO, $SnO_2$, GeO, $GeO_2$, $In_2O$, $In_2O_3$, PbO, $PbO_2$, $Pb_2O_3$, $Pb_3O_4$, AgO, $Ag_2O$, $Ag_2O_3$, $Sb_2O_3$, $Sb_2O_4$, $Sb_2O_5$, SiO, ZnO, CoO, NiO, FeO, $TiO_2$, $Li_3Ti_5O_{12}$, or a combination thereof. When the anode is charging, lithium ions intercalated into the anode material. When the anode is discharging, lithium ions are de-intercalated. The compound A, the compound B, the metastable state polymer, or the combination thereof used to form the nanoscale coating layer 102 are described in detail later.

Figure 2:
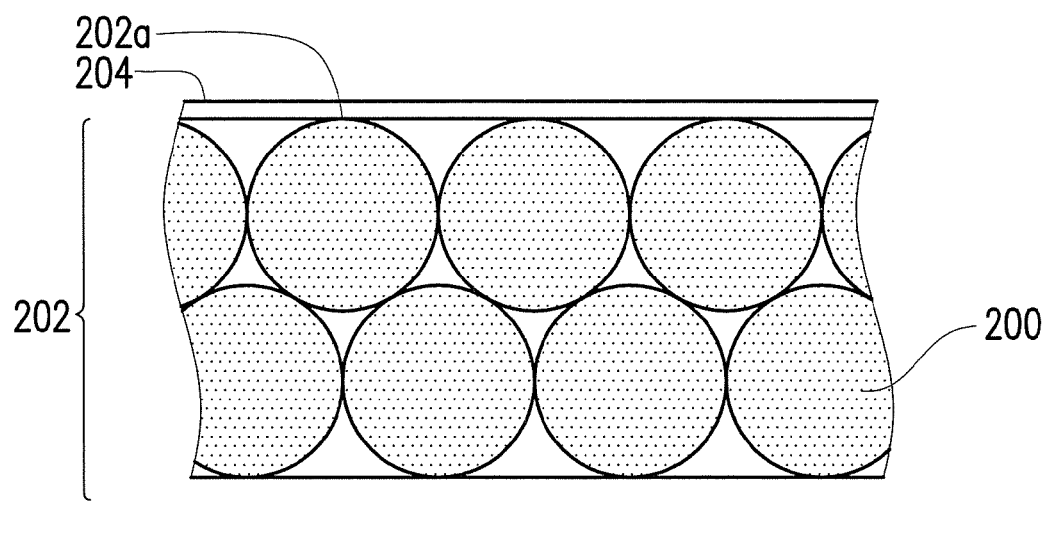
FIG. 2 is a cross-sectional schematic diagram of a composite electrode material of the lithium secondary battery according to the second exemplary embodiment of the disclosure.

FIG. 2 is a cross-sectional schematic diagram of a composite electrode material of the lithium secondary battery according to the second exemplary embodiment of the disclosure.

Referring to FIG. 2, the composite electrode material of the lithium secondary battery 20 includes an electrode plate 202 composed of an electrode active powder 200 and a nanoscale coating layer 204 coated on a surface 202a of the electrode plate 202, wherein the nanoscale coating layer 204 is formed from a metastable state polymer, a compound A, a compound B, or a combination thereof. The compound A is a monomer having a reactive terminal functional group, and the compound B is a heterocyclic amino aromatic derivative used as an initiator. Moreover, the weight ratio of the nanoscale coating layer 204 to the composite electrode material of the lithium secondary battery 20 is 0.005% to 10%. The thickness of the nanoscale coating layer 204 is, for instance, between 1 nm and 30 nm. The electrode active powder 200 used in the present embodiment is discussed in the first embodiment, and is not repeated herein. The compound A, the compound B, and the metastable state polymer used to form the nanoscale coating layer 204 and the fabrication thereof are described in detail later.

Figure 3:
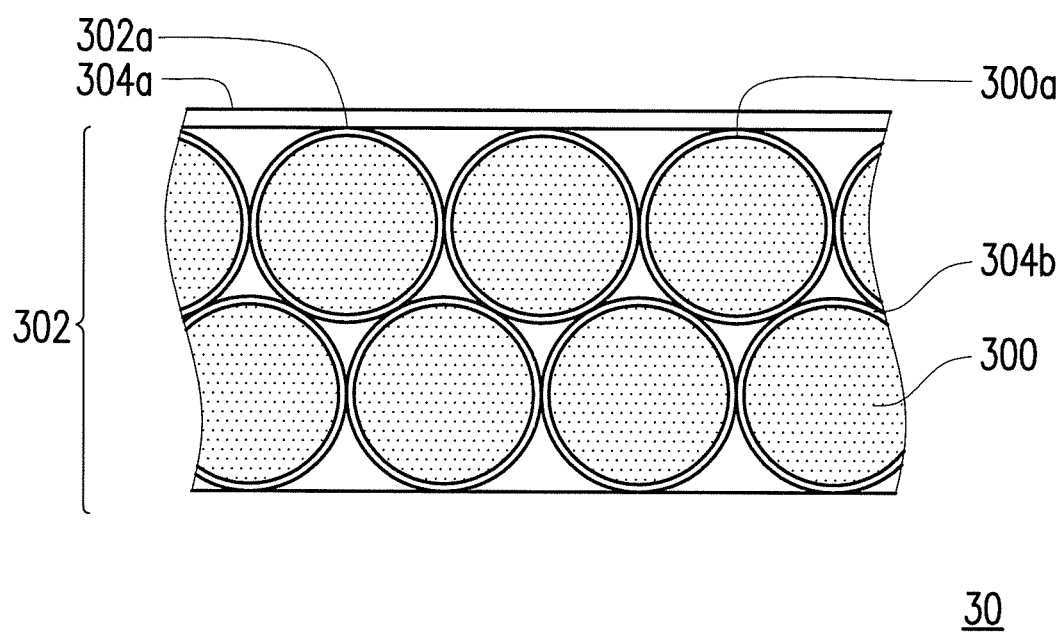
FIG. 3 is a cross-sectional schematic diagram of a composite electrode material of the lithium secondary battery according to the third exemplary embodiment of the disclosure.

FIG. 3 is a cross-sectional schematic diagram of a composite electrode material of the lithium secondary battery according to the third exemplary embodiment of the disclosure.

Referring to FIG. 3, the composite electrode material of the lithium secondary battery 30 includes an electrode plate 302 composed of an electrode active powder 300 and a first nanoscale coating layer 304a coated on a surface 302a of the electrode plate 302. A second nanoscale coating b is coated on a surface 300a of the electrode active powder 300. In particular, the first nanoscale coating layer 304a is formed from a first metastable state polymer, a compound A, a compound B, or a combination thereof. The weight ratio of the first nanoscale coating layer 304a to the composite electrode material of the lithium secondary battery 30 is, for instance, between 0.005% and 10%. The second nanoscale coating layer 304b is formed from a second metastable state polymer, the compound A, the compound B, or a combination thereof. The weight ratio of the second nanoscale coating layer 304b to the composite electrode material of the lithium secondary battery 30 is, for instance, between 0.005% and 10%. The electrode active powder 300 used in the present embodiment is discussed in the first embodiment, and is not repeated herein. The thickness of the second nanoscale coating layer 304b is, for instance, between 1 nm and 30 nm. The compound A, the compound B, the first and second metastable state polymers are described in detail later.

In the first, second, and third exemplary embodiments, the metastable state polymer, the first metastable state polymer, and the second metastable state polymer are each independently produced from the reaction of the compound A and the compound B, wherein the molar ratio of the compound A to the compound B is 10:1 to 1:10.

Moreover, the metastable state polymer mentioned in each embodiment of the disclosure is referenced in the synthesis embodiment of the disclosure with the Taiwan application no. 100147749.

The compound B is, for instance, represented by one or a combination of Formula (1) to Formula (9):

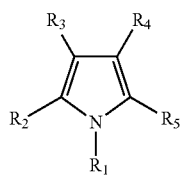

(1)

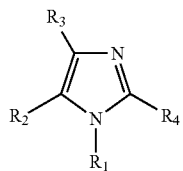

(2)

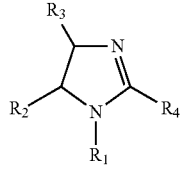

(3)

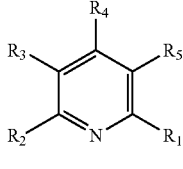

(4)

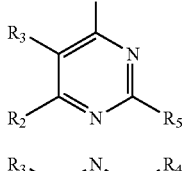

(5)

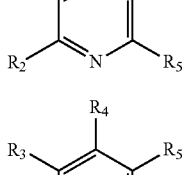

(6)

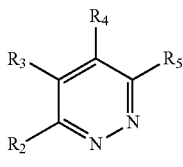

(7)

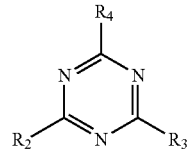

(8)

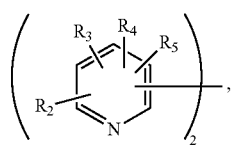

(9)

wherein $R_1$ is hydrogen, alkyl, alkyl alkenyl, phenyl, dimethylamino, or —$NH_2$, and $R_2$, $R_3$, $R_4$, and $R_5$ are each independently hydrogen, alkyl, alkyl alkenyl, halo, or —$NH_2$.

The exemplary compound B may be selected from the group consisting of imidazole, imidazole derivative, pyrrole, pyrrole derivative, pyridine, 4-tert-butylpyridine, 3-butylpyridine, 4-dimethylaminopyridine, 2,4,6-triamino-1,3,5-triazine, 2,4-bimethyl-2-imidazoline, pyridazine, pyrimidine, and pyrazine, as shown in Table 1 below.

TABLE 1

| Chemical Name | Structural Formula |
| --- | --- |
| imidazole | |
| pyrrole | |
| pyridine | |
| 4-tert-butylpyridine | |
| 3-butylpyridine | |
| 4-dimethylaminopyridine | |

TABLE 1-continued

| Chemical Name | Structural Formula |
|---|---|
| 2,4,6-triamino-1,3,5-triazine (melamine) | (triazine with three NH$_2$ groups) |
| 2,4-bimethyl 1-2-imidazoline | (imidazoline structure) |
| pyridazine | (pyridazine ring) |
| pyrimidine | (pyrimidine ring) |
| pyrazine | (pyrazine ring) |

The compound A is, for instance, represented by one or a combination of Formula (10) to Formula (13):

(10) (bismaleimide oligomer structure)

(11) —N(maleimide)—R$_6$—N(maleimide)—

(12) —N(maleimide)—C$_6$H$_4$—R$_7$—C$_6$H$_4$—N(maleimide)—

(13) —N(maleimide)—R$_8$ wherein n is an integer between 0 and 4;

R$_6$ is —RCH$_2$R'—, —RNHR—, —C(O)CH$_2$—, —R'O—R"OR'—, —CH$_2$OCH$_2$—, —C(O)—, —O—, —O—O—, —S—, —S—S—, —S(O)—, —CH$_2$S(O)CH$_2$—, —(O)S(O)—, —C$_6$H$_4$—, —CH$_2$(C$_6$H$_4$)CH$_2$—, —CH$_2$(C$_6$H$_4$)(O)—, —C$_2$H$_4$—(NC$_2$H$_4$)—C$_2$H$_4$, a siloxane group, biphenylenyl, substituted phenylene, or substituted biphenylenyl, R is C$_{1-4}$ alkylene, R' is C$_{1-4}$ alkylene, biphenylenyl, or substituted biphenylenyl, and R" is C$_{1-4}$ alkylene, —C$_6$H$_4$—C(CF$_3$)$_2$—C$_6$H$_4$—, biphenylenyl, or substituted biphenylenyl;

R$_7$ is —RCH$_2$—, —CH$_2$—(O)—, —C(CH$_3$)$_2$—, —O—, —O—O—, —S—, —S—S—, —(O)S(O)—), C(CF$_3$)$_2$—, or —S(O)—, wherein R is C$_{1-4}$ alkylene.

R$_8$ is hydrogen, C$_{1-4}$ alkyl, phenyl, benzyl, cyclohexyl, sulfonyl hydroxide, —C$_6$H$_4$CN, N-methoxycarbonyl, —(C$_6$H$_4$)—O(C$_2$H$_4$O)—CH$_3$, C$_2$H$_4$—(C$_2$H$_4$O)$_{11}$—OCH$_3$, or —C(O)CH$_3$.

Examples of the compound A are as shown in Table 2A.

| Chemical Name | Structural Formula |
|---|---|
| 4,4'-diphenylmethane bismaleimide | (4,4'-diphenylmethane bismaleimide structure)<br>CAS NO: 13676-54-5 |

| Chemical Name | Structural Formula |
|---|---|
| oligomer of phenylmethane maleimide | 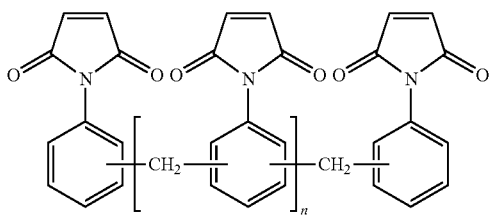<br>CAS NO: 67784-74-1 |
| m-phenylene bismaleimide | 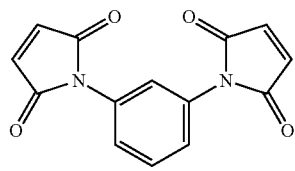 [SMILES: O=C1C=CC(=O)N1c1cccc(N2C(=O)C=CC2=O)c1]<br>CAS NO: 3006-93-7 |
| 2,2'-bis[4-(4-maleimidophenoxy)phenyl]propane | 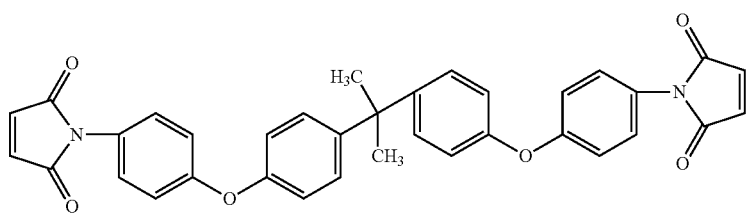 [SMILES: CC(C)(c1ccc(Oc2ccc(N3C(=O)C=CC3=O)cc2)cc1)c1ccc(Oc2ccc(N3C(=O)C=CC3=O)cc2)cc1]<br>CAS NO: 79922-55-7 |
| 3,3'-dimethyl-5,5'-diethyl-4,4'-diphenylmethane bismaleimide | 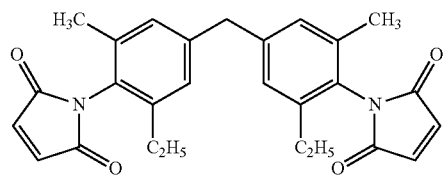 [SMILES: CCc1cc(Cc2cc(C)c(N3C(=O)C=CC3=O)c(CC)c2)cc(C)c1N1C(=O)C=CC1=O]<br>CAS NO: 105391-33-1 |
| 4-methyl-1,3-phenylene bismaleimide | 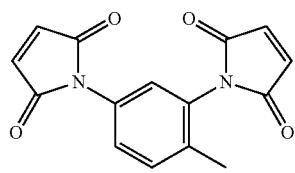 [SMILES: Cc1ccc(N2C(=O)C=CC2=O)cc1N1C(=O)C=CC1=O]<br>CAS NO: 6422-83-9 |
| 1,6'-bismaleimide-(2,2,4-trimethyl)hexane | 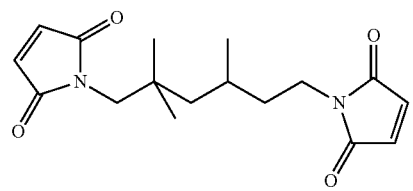 [SMILES: CC(CCN1C(=O)C=CC1=O)CC(C)(C)CN1C(=O)C=CC1=O]<br>CAS NO: 39979-46-9 |

| Chemical Name | Structural Formula |
|---|---|
| 4,4'-diphenylether bismaleimide | 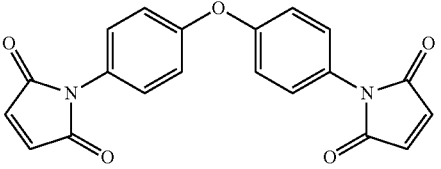 [SMILES: O=C1C=CC(=O)N1c1ccc(Oc2ccc(N3C(=O)C=CC3=O)cc2)cc1]<br>CAS NO: 77529-41-0 |
| 4,4'-diphenylsulfone bismaleimide | 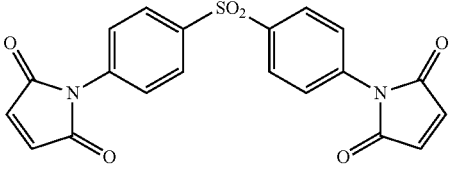<br>CAS NO: 13102-25-5 |
| 1,3-bis(3-maleimidophenoxy)benzene | 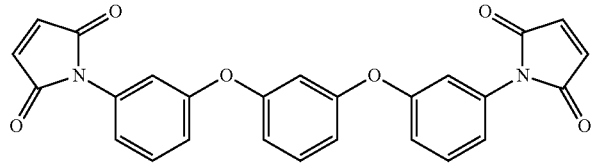 [SMILES: O=C1C=CC(=O)N1c1cccc(Oc2cccc(Oc3cccc(N4C(=O)C=CC4=O)c3)c2)c1]<br>CAS NO: 54909-96-5 |
| 1,3-bis(4-maleimidophenoxy)benzene | 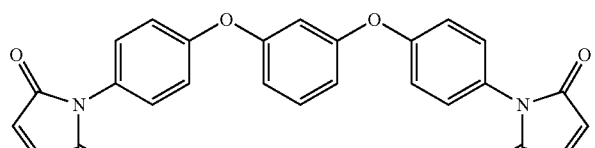<br>CAS NO: 115341-26-9 |
| 2,2-bis(4-(p-maleimidophenoxy)-phenyl)-hexafluoropropane | 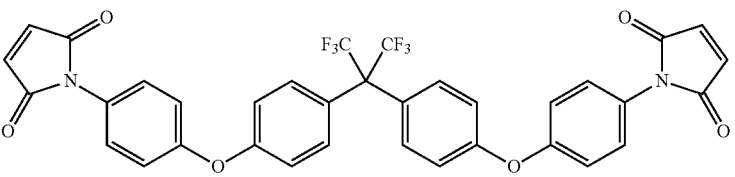 [SMILES: O=C1C=CC(=O)N1c1ccc(Oc2ccc(C(c3ccc(Oc4ccc(N5C(=O)C=CC5=O)cc4)cc3)(C(F)(F)F)C(F)(F)F)cc2)cc1] |
| 2,2-bis(p-maleimidophenyl)-hexafluoropropane | 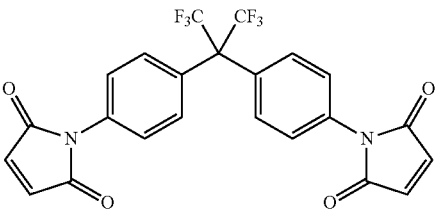 [SMILES: O=C1C=CC(=O)N1c1ccc(C(c2ccc(N3C(=O)C=CC3=O)cc2)(C(F)(F)F)C(F)(F)F)cc1] |
| 1,8-bis-maleimidodiethylene glycol | 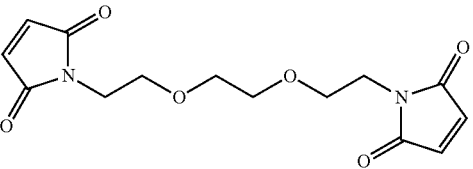 [SMILES: O=C1C=CC(=O)N1CCOCCOCCN1C(=O)C=CC1=O] |

| Chemical Name | Structural Formula |
|---|---|
| tris(2-maleimidoethyl) amine | (structure shown) |
| poly(ethylene glycol(11)) 4-maleimido-phenyl methyl diether terminated | (structure shown) |
| 4-maleimidophenol | (structure shown) |
| 4-maleimido-benzenesufonic acid | (structure shown) |
| poly(ethylene glycol (11)) 2-maleimido-ethyl methyl diether terminated | (structure shown) |
| 2-maleimido monopropylene glycol 1-(2-methoxyethyl) ether | (structure shown) |
| ethylene glycol 2-maleimidopropyl methyl diether | (structure shown) |
| poly(dimethsiloxane), bis(3-maleimido-propyl-dimethylsilyl) terminated | (structure shown) |

Other examples of the compound A are as shown in Table 2B.

TABLE 2B

| Chemical Name | Structural Formula |
| --- | --- |
| 5-(2-methoxy-ethoxy)-5H-furan-2-one | 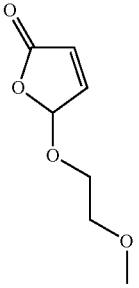 |
| 5-(2-methoxy-ethoxy)-cyclohex-2-ene-1,4-dione | 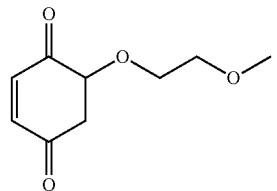 |

In another embodiment, the compound A may also be polyethylene glycol dimethacrylate, bis[[4-[(vinyloxy)methyl]cyclohexyl]methyl] isophthalate, or triallyl trimellitate.

In the third exemplary embodiment, the first and second metastable state polymers used in the first nanoscale coating layer and the second nanoscale coating layer may be the same or different.

The synthesis method of the metastable state polymer includes first dissolving the compound A in a solvent to form a mixture solution. The solvent includes a high-polarity solvent such as γ-butyrolactone (GBL), ethylene carbonate (EC), propylene carbonate (PC), or N-methylpyrollidone (NMP) that may provide higher solubility to facilitate thermal polymerization of the reactants. The high-polarity solvent may also provide flexible variation of the solid content. The characteristics broaden the application scope of the disclosure.

Then, the compound B is added in batches in the mixture solution. A thermal polymerization is then performed on the mixture solution. The molar ratio of the compound A to the compound B is, for instance, 10:1 to 1:10, preferably 1:1 to 5:1. The compound B may be added in equal amounts or different amounts in 2 to 30 batches, preferably 4 to 16 batches. The time of the addition may be 5 minutes to 6 hours per batch. Preferably, the time between the addition of each batch is 15 minutes to 2 hours. The compound B may be added at a reaction temperature of 60° C. to 150° C., with a preferred temperature range of 120° C. to 140° C. Moreover, the duration of action refers to the continued reaction time after the compound B is completely added, which may be 0.5 hours to 48 hours, preferably 1 hour to 24 hours.

Since the compound B is added in batches (a plurality of times, i.e. two times or more than two times) in the mixture solution containing a system of the compound A/solvent having the reaction temperature, and then a thermal polymerization is performed, gelation or a reticular structure resulting from an over reaction due to the addition of all of the material at once may be avoided.

The metastable state polymer synthesized with the above method may be stored for a long period at room temperature (or above room temperature), and the viscosity of the metastable state polymer does not change rapidly after unsealing. Moreover, the metastable state polymer reserved a portion of functional groups that may be reacted again, which may facilitate subsequent processes. The unreacted functional groups may be reacted by heating or applying voltage as needed. For instance, when the temperature of the metastable state nitrogen-containing polymer is 160° C. to 200° C., another reaction may be induced to completely transform the macromolecules of the metastable state polymer into a polymer.

Figure 4:
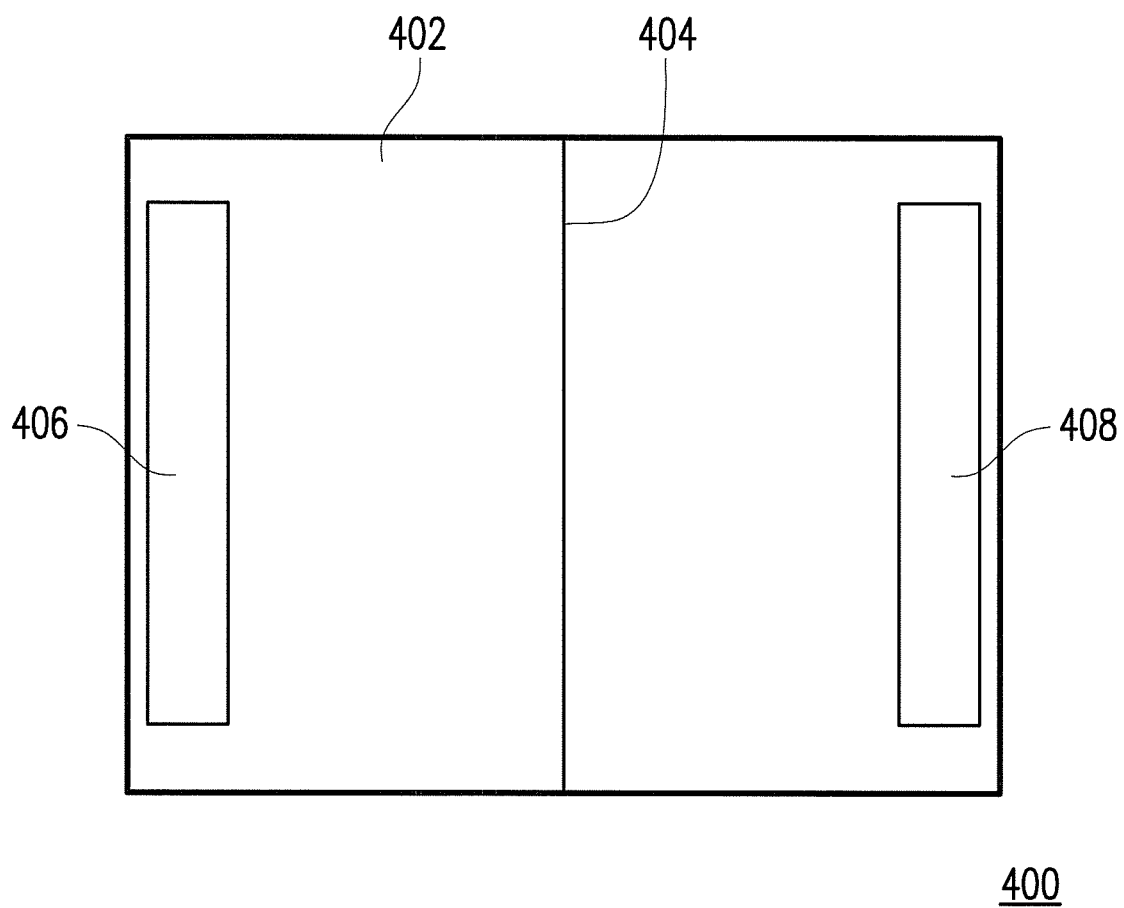
FIG. 4 is a schematic diagram of a lithium secondary battery according to the fourth embodiment of the disclosure.

FIG. 4 is a schematic diagram of a lithium secondary battery according to the fourth exemplary embodiment of the disclosure.

Referring to FIG. 4, the lithium secondary battery 400 at least includes at least an electrode material, a non-aqueous electrolyte solution 402, and a separator 404 located in the non-aqueous electrolyte solution 402, wherein the non-aqueous electrolyte solution 402 includes a non-aqueous solvent and lithium salt. The electrode material of the fourth exemplary embodiment includes a cathode material 406 and an anode material 408, wherein the composite electrode material of the lithium secondary battery mentioned in the first to third exemplary embodiments may be used in at least one of the cathode material 406 and the anode material 408. Of course, the composite electrode material of the lithium secondary battery mentioned in the first to third exemplary embodiments may also be used in both the cathode material 406 and the anode material 408. Although FIG. 4 only shows the cathode material 406, anode material 408, non-aqueous electrolyte solution 402, and separator 404, the disclosure is not limited thereto.

Fabrication Method of Composite Cathode of Lithium Secondary Battery

When the cathode material 406 of the lithium secondary battery 400 is the composite electrode material of the lithium secondary battery mentioned in the first to third exemplary embodiments, the fabrication method thereof is exemplified as follows.

The cathode active material containing 0.005% to 10% (concentration ratio with respect to the cathode) of metastable state polymer is stirred in a planetary-type mixing machine or a regular machine for 3 to 10 minutes. Then, a nanoscale layer about 1 nm to 30 nm thick is coated. The result is a composite cathode active material. The composite cathode active material, a conductive additive, and a binder are dissolved in NMP in the proportions of 80% to 95%, 3% to 15%, and 3% to 10% respectively and evenly mixed and stirred. Then, the mixture is evenly coated on an aluminum foil roll 35 cm wide and 20 μm thick. The dried cathode roll is rolled and slit, and finally vacuum dried for 4 hours at about 110° C. The cathode active material may be lithiated oxide, lithiated sulfide, lithiated selenide, lithiated telluride, or a combination thereof, wherein the compounds are composed of elements such as vanadium, titanium, chromium, copper, molybdenum, niobium, iron, nickel, cobalt, and manganese. The conductive additive may be carbon black, graphite, acetylene black, nickel powder, aluminum powder, titanium powder, stainless steel powder, or a combination thereof. The binder may be a fluorine resin binder such as polyvinylidene fluoride (PVDF), Teflon, styrene-butadiene rubber, polyamide, melamine resin, a carboxymethylcellulose (CMC) binder, or a polyacrylic latex binder (LA132).

Fabrication Method of Composite Anode of Lithium Secondary Battery

When the anode material 408 of the lithium secondary battery 400 is the composite electrode material of the lithium secondary battery mentioned in the first to third exemplary embodiments, the fabrication method thereof is exemplified as follows.

The anode active material containing 0.005% to 10% (concentration ratio with respect to the anode) of metastable state polymer is stirred in a planetary-type mixing machine or a regular machine for 3 to 10 minutes. Then, a nanoscale layer about 1 nm to 30 nm thick is coated. The result is the composite anode active material. Then, the composite anode active material, a conductive additive, and a binder are dissolved in NMP in the proportions of 90% to 95%, 1% to 10%, and 3% to 10%, respectively. After evenly stirring, the mixture is coated on a copper foil roll with 35 cm wide and 10 μm thick. The anode roll formed is rolled and slit, and similarly vacuum dried for 4 hours at 110° C. The anode active material may be MCMB, MGP, VGCF, CNT, coke, carbon black, graphite, acetylene black, carbon fiber, glassy carbon, SiC, a lithium alloy, or a combination thereof. The anode selected from the metal group is, for instance, Al, Zn, Bi, Cd, Sb, Si, Pb, Sn, $Li_3FeN_2$, $Li_{2.6}Co_{0.4}N$, $Li_{2.6}Cu_{0.4}N$, or a combination thereof. The anode active material may further be a metal oxide such as SnO, $SnO_2$, GeO, $GeO_2$, $In_2O$, $In_2O_3$, PbO, $PbO_2$, $Pb_2O_3$, $Pb_3O_4$, AgO, $Ag_2O$, $Ag_2O_3$, $Sb_2O_3$, $Sb_2O_4$, $Sb_2O_5$, SiO, ZnO, CoO, NiO, FeO, $TiO_2$, $Li_3Ti_5O_{12}$, SiC, or a combination thereof. The binder may be a fluorine resin binder such as PVDF, Teflon, styrene-butadiene rubber, polyamide, melamine resin, a CMC binder, or a polyacrylic latex binder (LA132).

In the fourth exemplary embodiment, the separator 404 is, for instance, a PP/PE/PP triple-layer film with a thickness of 10 μm to 20 μm.

Non-Aqueous Electrolyte Solution and Fabrication Method Thereof

The non-aqueous electrolyte solution 402 of the fourth exemplary embodiment includes lithium salt, an organic solvent, and the metastable state polymer additive above, wherein the metastable state polymer additive accounts for 0.01 wt % to 5 wt % of the total content of the non-aqueous electrolyte solution.

The lithium salt includes $LiPF_6$, $LiClO_4$, $LiBF_4$, $LiSO_3CF_3$, $LiN(SO_2CF_3)_2$, $LiN(SO_2CF_2CF_3)_2$, LiTFSI, $LiAsF_6$, $LiSbF_6$, $LiAlCl_4$, $LiGaCl_4$, $LiNO_3$, $LiC(SO_2CF_3)_3$, LiSCN, $LiO_3SCF_2CF_3$, $LiC_6F_5SO_3$, $LiO_2CCF_3$, $LiSO_3F$, $LiB(C_6H_5)_4$, $LiB(C_2O_4)_2$, or a combination thereof. The concentration of the lithium salt is between 0.5 and 1.5 mol/L (M).

The organic solvent includes ethylene carbonate (EC), propylene carbonate (PC), butylene carbonate, dipropyl carbonate, acid anhydride, N-methylpyrrolidone, N-methyl acetamide, N-methyl formamide, dimethyl formamide, γ-butyrolactone, acetonitrile, dimethyl sulfoxide, dimethyl sulfite, 1,2-diethoxyethane, 1,2-dimethoxyethane, 1,2-dibutoxyethane, tetrahydrofuran, 2-methyl tetrahydrofuran, propylene oxide, sulfites, sulfates, phosphonates, or a derivative thereof.

Moreover, the organic solvent may also include carbonate, ester, ether, ketone, or a combination thereof. The ester is selected from the group consisting of methyl acetate, ethyl acetate, methyl butyrate, ethyl butyrate, methyl propionate, ethyl propionate, and propyl acetate (PA). The carbonate includes EC, PC, diethyl carbonate (DEC), ethyl methyl carbonate (EMC), dimethyl carbonate (DMC), vinylene carbonate, butylene carbonate, dipropyl carbonate, or a combination thereof.

The fabrication method of the lithium secondary battery 400 includes disposing the cathode material 406 (cathode or composite cathode), anode material 408 (anode or composite anode), and separator 404 in a rectangular aluminum foil bag housing after winding and rolling, wherein the dimension of the housing is 38 mm×3.5 mm×62 mm. Then, the non-aqueous electrolyte solution 402 is filled therein.

A plurality of experimental examples and comparative examples are listed below to validate the efficacy of the disclosure. The following tests are conducted on the fabricated lithium half-cells or lithium batteries: decomposition voltage test, capacity-voltage test, charge-discharge cycle test, scanning electron microscopy (SEM) and transmission electron microscopy (TEM).

<<Decomposition Voltage Test>>

Linear sweep voltammetry (LSV) includes continuously testing a current passing through a battery or an electrode, and recording the variation of the potential over time. Here, the decomposition voltage of the non-aqueous electrolyte solution is measured between 3V and 9V with the Biological (VMP3) fixed potential instrument at a scan rate of 0.5 mv/s.

<<Capacity-Voltage Test>>

The C-V (capacity-voltage) curve describes the relationship between the voltage and the capacity of the battery when charging and discharging. In the first to fifth cycles, the battery is charged and discharged at a rate of 0.1 C (C-rate), 0.2 C, 0.5 C, 1 C, and 2 C individually to measure the capacity. The test first charges with a constant current (CC), then charges with a constant voltage (CV), wherein the constant voltage is 4.2V. At the same time, the test is conducted with the cut off current at one twentieth the value of the constant current.

<<Charge-Discharge Cycle Test>>

Using a cycle method that charges at 0.2 C and discharges at 0.5 C, the variation of the battery capacity is recorded after charging and discharging a plurality of times.

Experimental Example 1

First, the composite $LiNi_4Co_4Mn_2O_2$ is used as a cathode material and a lithium metal is used as an anode. A regular electrolyte solution (1.1M $LiPF_6$ EC/EMC/DEC) is used in conjunction. The weight ratio of the metastable state polymer to all of the materials is about 0.5%.

The metastable state polymer of experimental example 1 is formed by dissolving 3% oligomer of phenylmethane maleimide (the compound A) in NMP to form a mixture solution. Then, 2,4-bimethyl-2-imidazoline (the compound B) is added in batches in the mixture solution and a thermal polymerization is performed at 130° C. for 8 hours. The molar ratio of the 3% oligomer of phenylmethane maleimide to the 2,4-bimethyl-2-imidazoline is 2:1. Here, the metastable state polymer of experimental example 1 is obtained.

Figure 17:
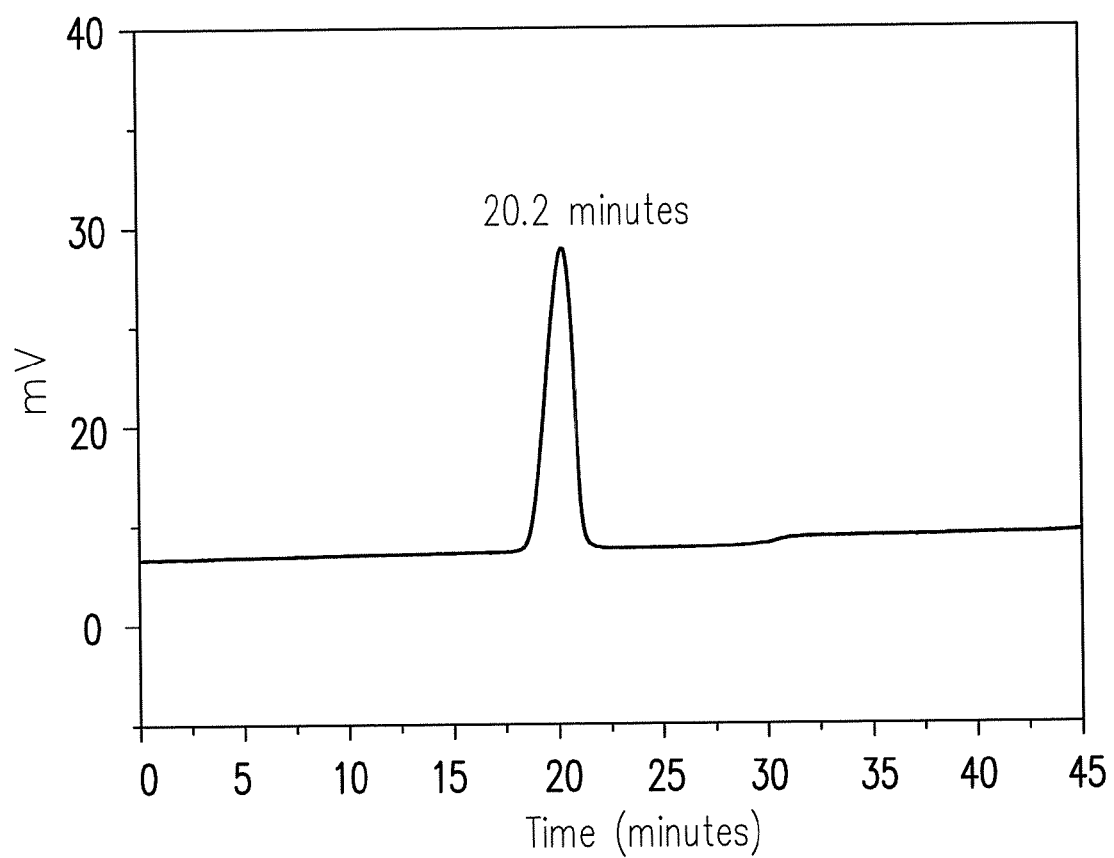
FIG. 17 is a gel permeation chromatography (GPC) diagram of the metastable state polymer of experimental example 1.

The metastable state polymer of experimental example 1 is a polymer with a narrow molecular weight distribution, wherein the GPC (gel permeation chromatography) peak time is 20.2 minutes and the PDI (polydispersity index) of the molecular weight is 1.2, as shown in FIG. 17. The definition of the PDI of the molecular weigh is dividing weight average molecular weight by number average molecular weight.

Figure 5:
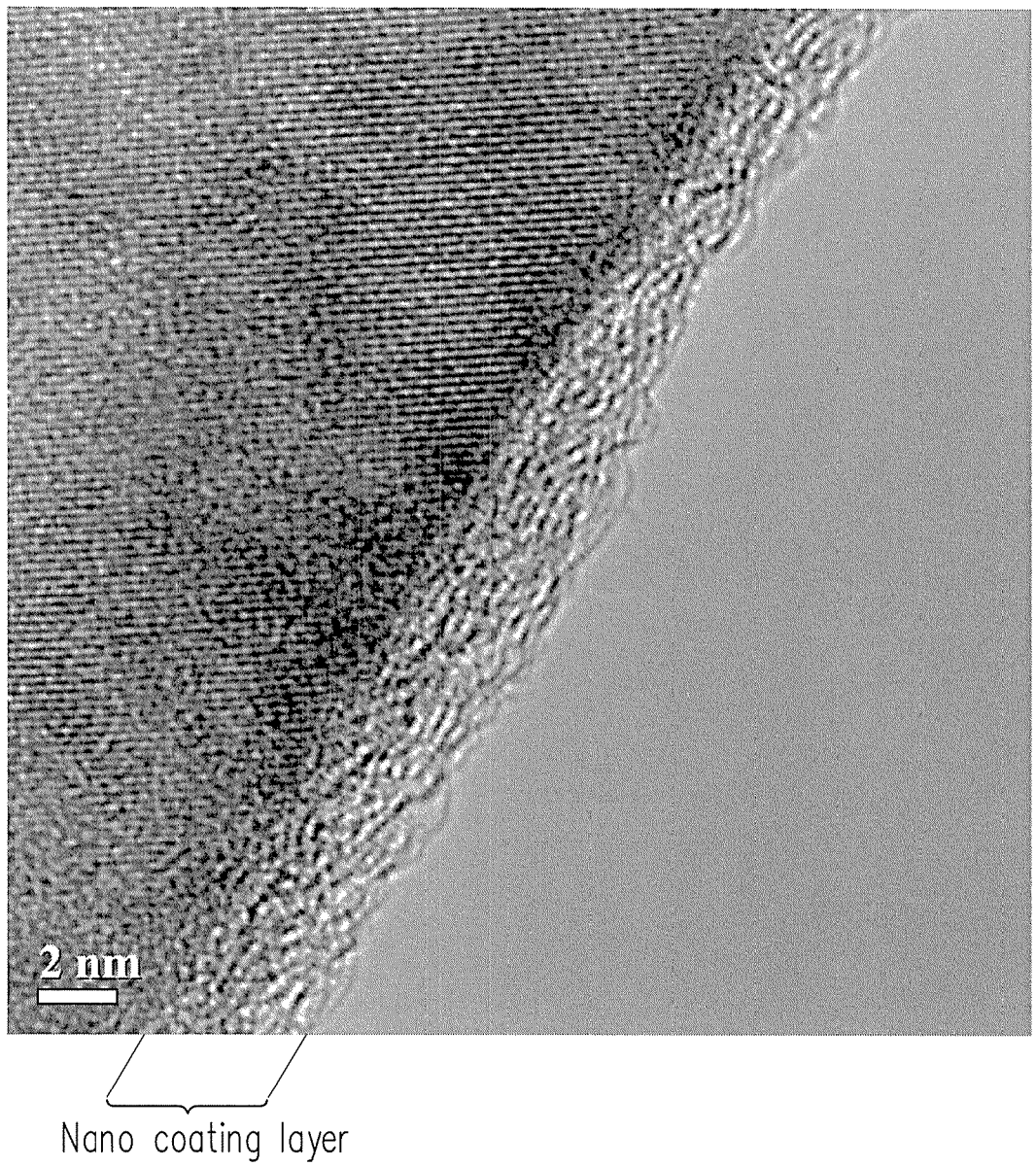
FIG. 5 is a transmission electron microscope (TEM) image of the composite cathode material of the lithium secondary battery fabricated in experimental example 1.

In experimental example 1, the cathode active powder is $LiNi_4Co_4Mn_2O_2$, the conductive additive is carbon black (Super P®), and the binder is PVDF. The metastable state polymer is directly coated on the cathode material with a mixing method and then, by using TEM to observe the obtained composite cathode material of the lithium secondary battery, the TEM image of FIG. 5 may be obtained. The TEM image shows that the surface of the cathode active powder does have a nanoscale coating layer, wherein the thickness is about 2 nm to 5 nm.

Figure 6:
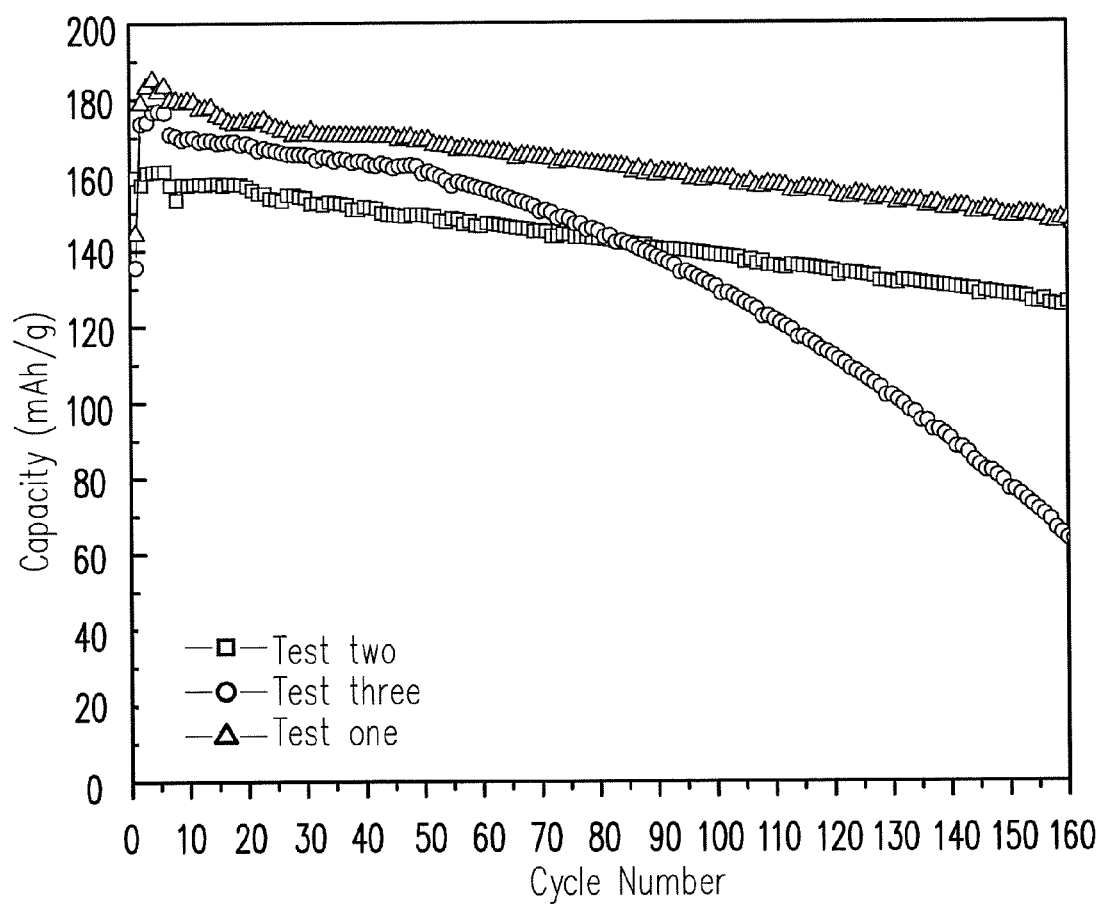
FIG. 6 illustrates a curve diagram of the result of the charge-discharge cycle test of experimental example 1.

Then, the lithium secondary battery is fabricated according to the method of the fourth exemplary embodiment. As shown in FIG. 6, a capacity test (test one) of battery cycle life is conducted using the composite cathode material of the lithium secondary battery at high temperature (about 55° C.) and a voltage of 2.8V-4.3V. The result shows that a certain capacity is still retained when the cycle number reaches 70. Moreover, after 150 cycles, the capacity may still reach above 150 mAh/g, indicating a retention rate greater than 82%.

Comparative Example 1

Moreover, using an uncoated cathode material, a capacity test of battery cycle life is conducted under the same temperature condition as experimental example 1 and a normal voltage range of 2.8V-4.2V. The result is similarly shown in FIG. 6 (test two), and it is seen that the capacity is much lower compared to test one of experimental example 1. Further using an uncoated cathode material under the same temperature condition but with a voltage of 2.8V-4.4V, a capacity test (test three) of battery cycle life is conducted. The result shows that when the cycle number reaches 70, the capacity is significantly decreased, and after the cycle number reaches 150, the capacity is decreased to a very poor level.

It is known from FIG. 6 that, when the charging voltage is increased from 4.2V to 4.4V, the composite cathode material of the lithium secondary battery containing a coated nanoscale coating layer has an apparently stable cycle life and a significantly increased energy density.

Experimental Example 2

The composite $LiNi_4Co_4Mn_2O_2$ from experimental example 1 is used as a cathode material and a lithium metal is used as an anode. A regular electrolyte solution (1.1M $LiPF_6$ EC/EMC/DEC) is used. The weight ratios of the metastable state polymer to the composite electrode material of the lithium secondary battery are individually changed into 1% (test one), 0.75% (test two), and 0.5% (test three). At 55° C. and under the voltage condition of 2.8V-4.4V, the batteries are charged at 0.2 C and discharged at 0.5 C independently to obtain the curve diagram of FIG. 7 between battery cycle life and capacity.

Comparative Example 2

Moreover, an uncoated $LiNi_4Co_4Mn_2O_2$ is used as a cathode material and a lithium metal is used as an anode material. A regular electrolyte solution (1.1M $LiPF_6$ EC/EMC/DEC) is used in conjunction. Similarly, at 55° C. and under the voltage condition of 2.8V-4.4V, the battery is charged at 0.2 C and discharged at 0.5 C. The result (test four) is similarly shown in FIG. 7.

Figure 7:
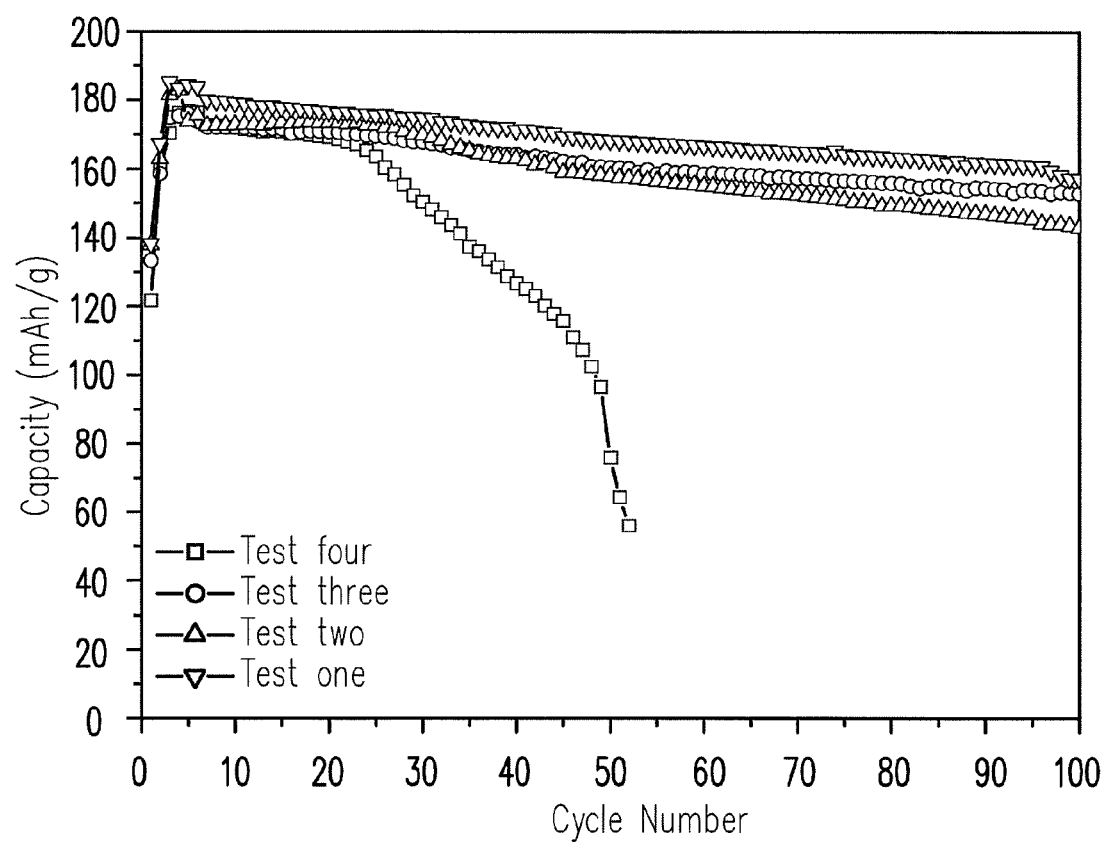
FIG. 7 illustrates a curve diagram of the result of the charge-discharge cycle test of experimental example 2.

It is known from FIG. 7 that, the cycle life of the uncoated cathode material is significantly shortened, and the capacity is also decreased significantly. On the other hand, regarding the composite cathode material of the lithium secondary battery with a nanoscale coating layer coated on the surface, in the test examples where the weight ratios of the electrode material of the metastable state polymer are 0.5%, 0.75%, and 1%, a high capacity and a stable cycle life are retained. When the cycle number reaches 100, the capacity is still retained at 88%. Therefore, each of the test examples has an apparently stable cycle life.

Experimental Example 3

Figure 8:
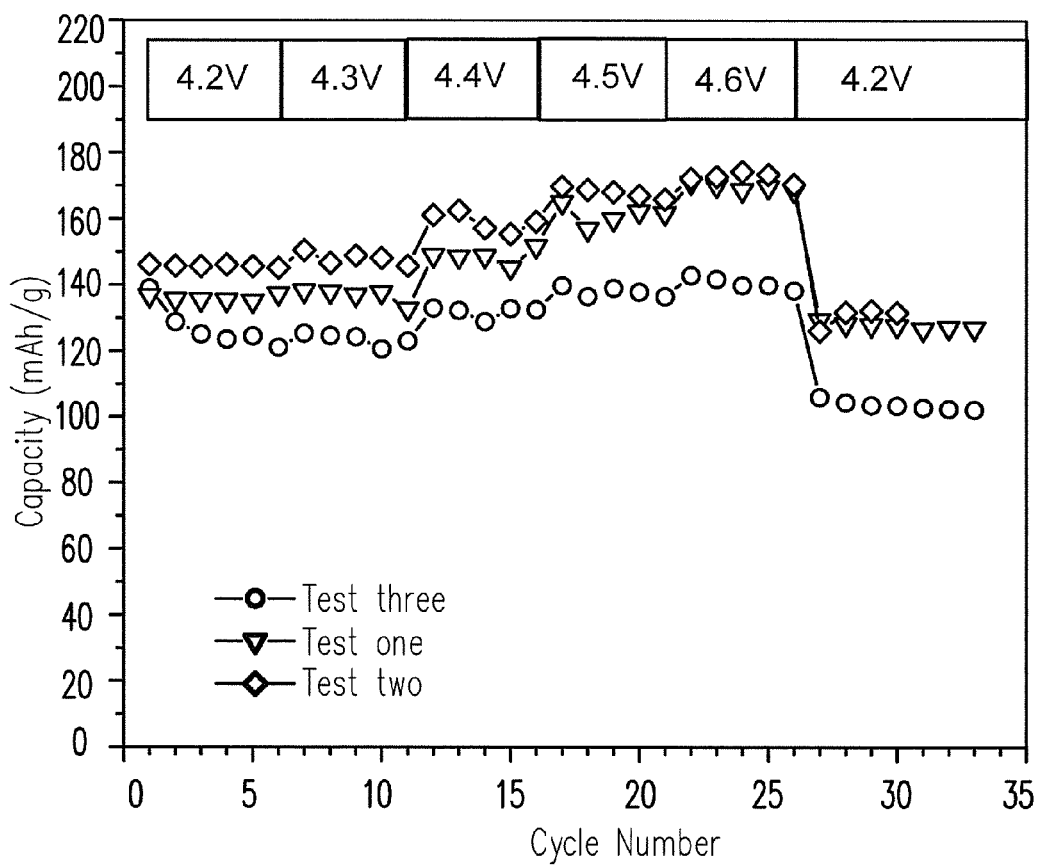
FIG. 8 illustrates a curve diagram of the result of the charge-discharge cycle test of experimental example 3.

The composite $LiNi_4Co_4Mn_2O_2$ cathode material from experimental example 1 is used and a lithium metal is used as an anode. A regular electrolyte solution (1.1M $LiPF_6$ EC/EMC/DEC) is used in conjunction. A capacity test (test one) is conducted on the battery at a high operating voltage at room temperature and different voltages (including 4.2V, 4.3V, 4.4V, 4.5V, and 4.6V). The result is shown in FIG. 8.

Moreover, the composite $LiNi_4Co_4Mn_2O_2$ cathode material from experimental example 1 is used and a lithium metal is used as an anode. An electrolyte solution (1.1M $LiPF_6$ EC/EMC/DEC) containing a 1.5% metastable state polymer additive is used in conjunction. Under the same test conditions as test one of experimental example 3, a capacity test (test two) is conducted on the battery at a high operating voltage. The result is shown in FIG. 8.

Comparative Example 3

Then, a capacity test (test three) is conducted on the battery at a high operating voltage with the cathode material containing only uncoated cathode $LiNi_4Co_4Mn_2O_2$ and the lithium metal anode in conjunction with a regular electrolyte solution (EC/EMC/DEC) under the same test conditions as experimental example 3. The result is shown in FIG. 8.

It is known from FIG. 8 that, at the test voltages of 4.2V, 4.3V, 4.4V, 4.5V, and 4.6V, the capacities of test one and test two are both higher than the capacity of test three. The composite $LiNi_4Co_4Mn_2O_2$ cathode material does produce 16% more capacity at a high operating voltage.

Experimental Example 4

Figure 9:
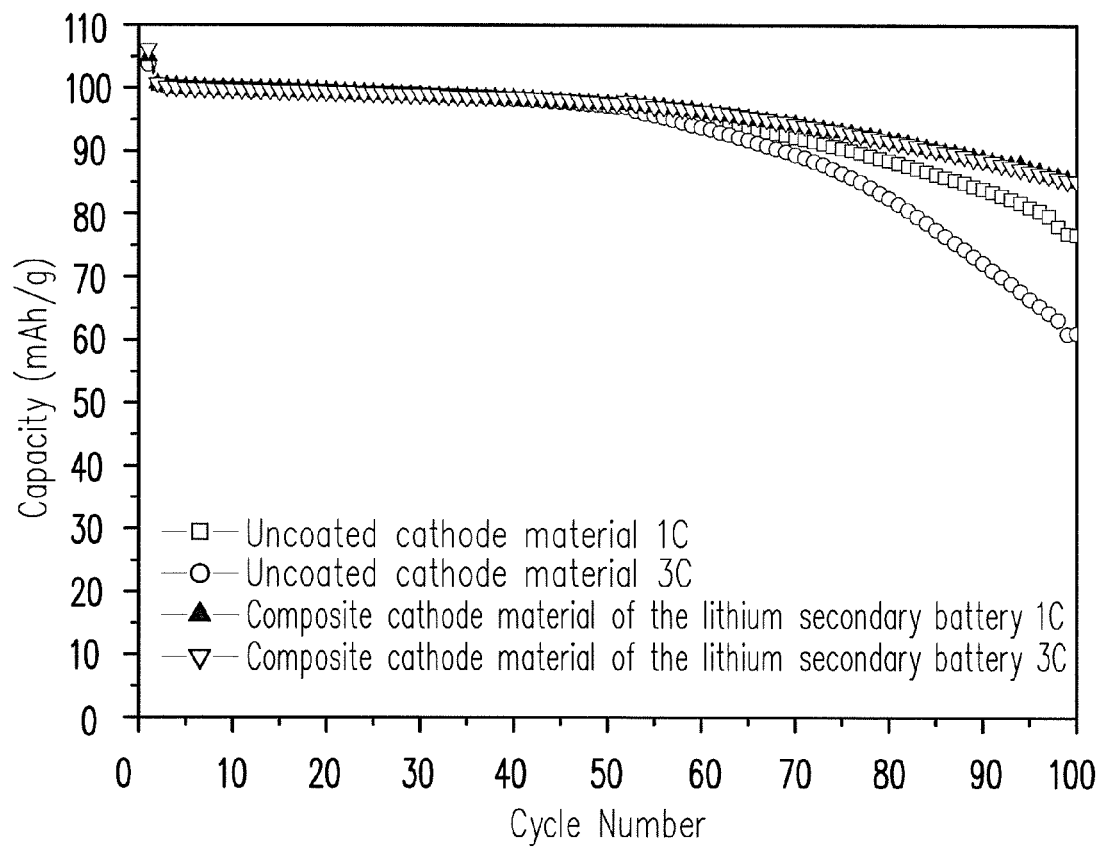
FIG. 9 illustrates a curve diagram of the result of the charge-discharge cycle test of experimental example 4.
Figure 10A:
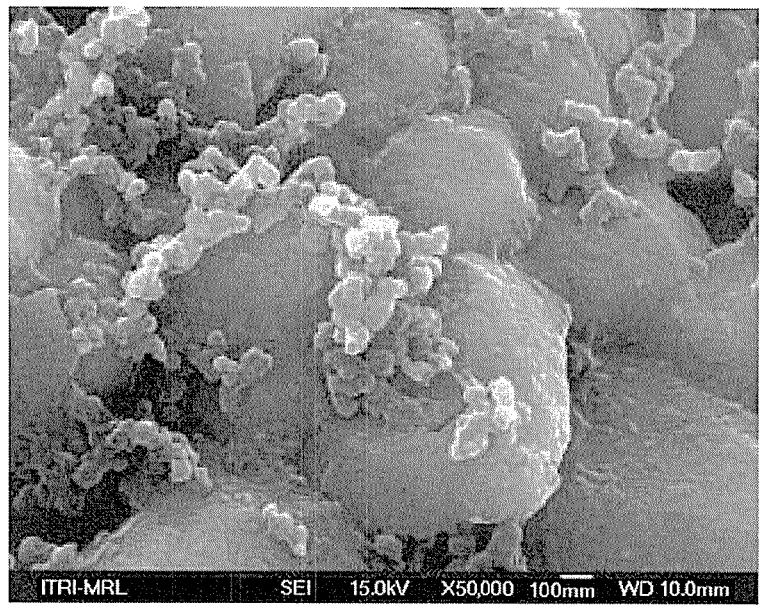
FIG. 10A is a scanning electron microscope (SEM) image of the initial composite cathode material of the lithium secondary battery fabricated in experimental example 4.

The composite $LiNi_4Co_4Mn_2O_2$ cathode material from experimental example 1 and an MGP anode, in conjunction with a regular electrolyte solution (1.1M $LiPF_6$ EC/EMC/DEC), are assembled into an 18650 large battery. Then, at 55° C. and under the voltage condition of 2.8V-4.3V, the 18650 large battery is independently charged and discharged at 1 C and 3 C. The result is shown in FIG. 9. At the same time, the initial composite cathode material of the lithium secondary battery and the surfaces of the cathode material and anode material (graphite carbon material) after 100 cycles (1 C) are observed with an SEM. The initial FIG. 10A, FIG. 10B of the cathode material after a plurality of cycles, and FIG. 10C of the anode material after a plurality of cycles are obtained.

Comparative Example 4

Figure 11A:
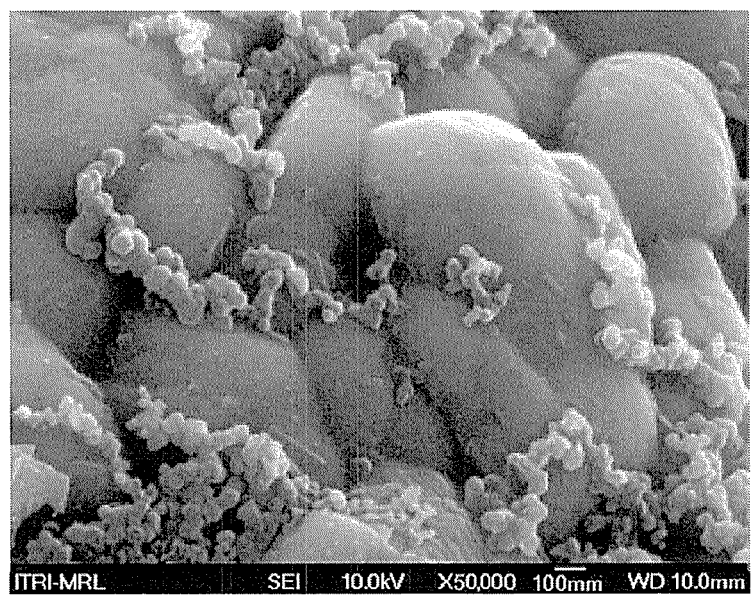
FIG. 11A is a SEM image of the initial uncoated cathode material fabricated in experimental example 4.
Figure 11B:
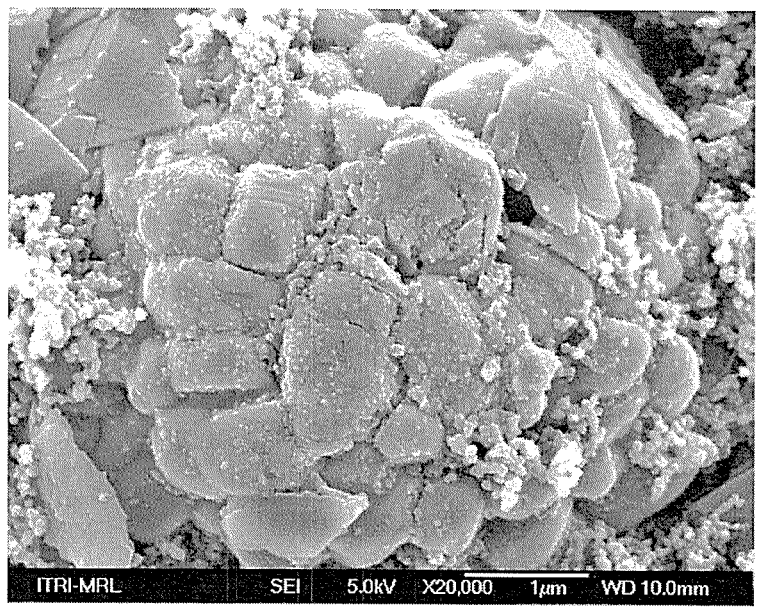
FIG. 11B is a SEM image of the uncoated cathode material fabricated in experimental example 4 after multiple cycles.
Figure 11C:
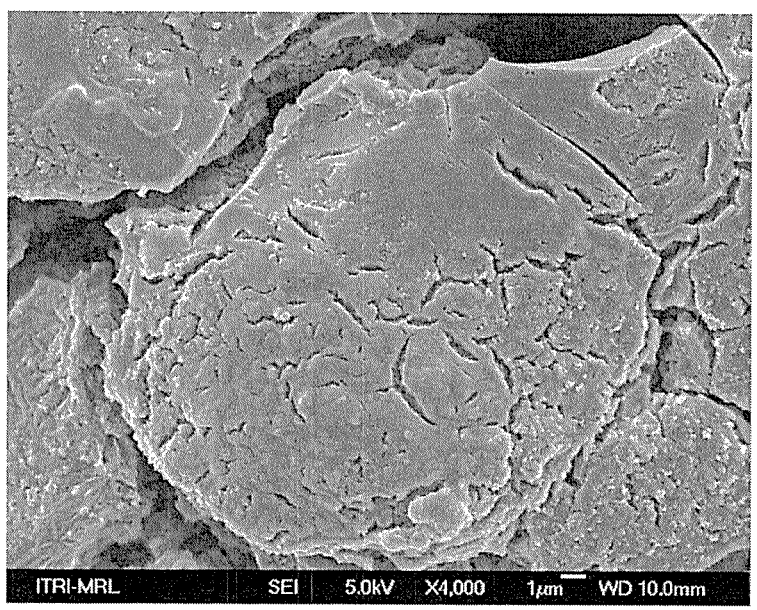
FIG. 11C is a SEM image of the uncoated anode material fabricated in experimental example 4 after multiple cycles.

Moreover, an uncoated $LiNi_4Co_4Mn_2O_2$ cathode material and an MGP anode material, in conjunction with a regular electrolyte solution (1.1M $LiPF_6$ EC/EMC/DEC), are assembled into a 18650 large battery. Then, at 55° C. and under the voltage condition of 2.8V-4.3V, the 18650 large battery is independently charged and discharged at 1 C and 3 C. The result is similarly shown in FIG. 9. At the same time, the initial uncoated cathode material and the surfaces of the cathode material and anode material (graphite carbon material) 100 cycles (1 C) are observed with an SEM. The initial FIG. 11A, FIG. 11B of the cathode material after a plurality of cycles, and FIG. 11C of the anode material after a plurality of cycles are obtained.

It is known from FIG. 9 that, the composite cathode material of the lithium secondary battery having a nanoscale coating layer on the surface, compared to the composite cathode material without a nanoscale coating layer, has a significantly higher capacity retention in a high-temperature cycle life test.

Figure 10B:
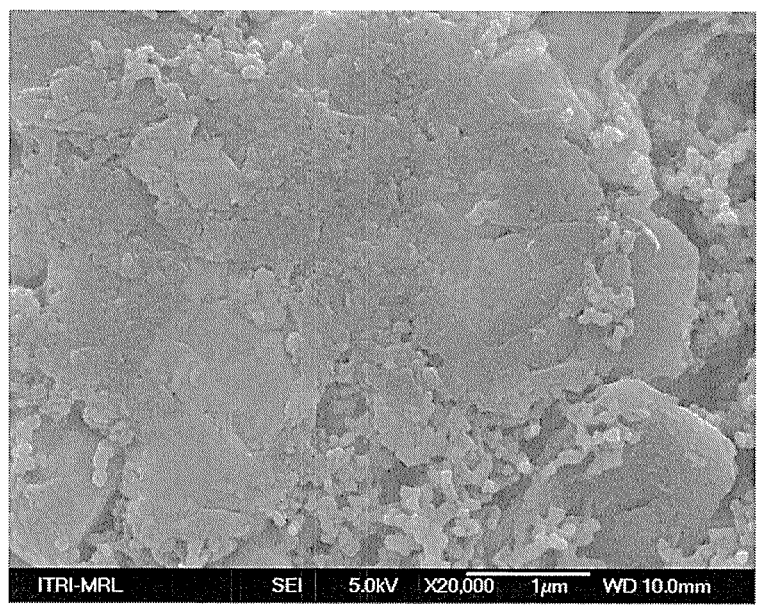
FIG. 10B is a SEM image of the composite cathode material of the lithium secondary battery fabricated in experimental example 4 after multiple cycles.
Figure 10C:
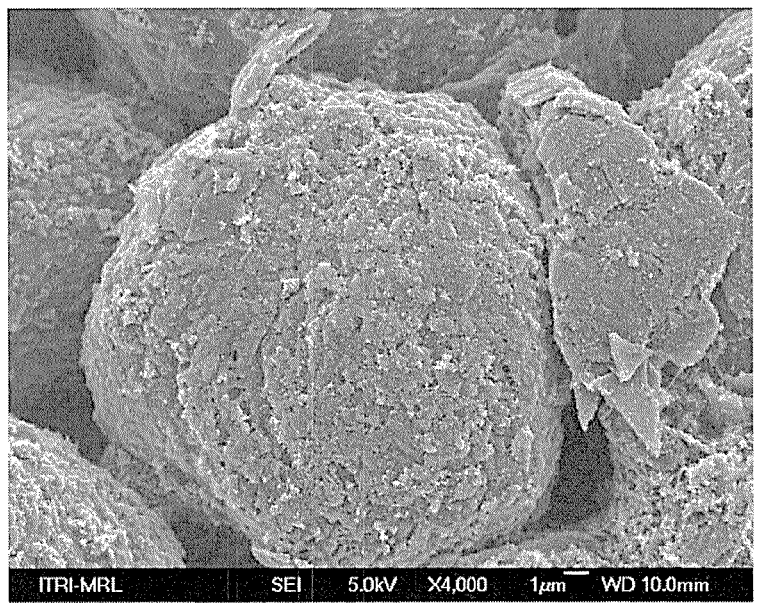
FIG. 10C is a SEM image of the composite anode material of the lithium secondary battery fabricated in experimental example 4 after multiple cycles.

Moreover, it is observed from the SEM image that, after 100 cycles of charging and discharging, the thickness of the coating layer of the composite cathode material of the lithium secondary battery having a nanoscale coating layer on the surface is greater and the coating layer is evenly coated on the cathode active powder (refer to FIG. 10B). However, the surface of the uncoated cathode material is unchanged (refer to FIG. 11B). Moreover, it is observed from the SEM image of the surface of the anode material that, the anode material of the large battery composed of an uncoated cathode material developed cracks (refer to FIG. 11C). However, in the case of the cathode material of the lithium secondary battery having a nanoscale coating layer on the surface, the integrity of the anode material of the battery may be maintained (refer to FIG. 10C), possibly due to the ability of the cathode material to stabilize the SEI composition.

Experimental Example 5

First, mesocarbon microbeads (MCMB) are fabricated and used as an anode active material. The MCMB anode with added 0.5% metastable state polymer (concentration ratio with respect to the anode) is stirred in a planetary-type mixing machine or a regular machine for 3 to 10 minutes. A nanoscale layer with a thickness of about 1 nm to 30 nm is coated, and the result is the mesocarbon microbeads (MCMB) anode active material.

The metastable state polymer of experimental example 5 is formed by first dissolving 4,4'-diphenylmethane bismaleimide and 2,2-bis(4-(p-maleimidophenoxy)-phenyl)-hexafluoropropane in NMP at a molar ratio of 2:1 to form a 3% mixture solution. Then, 2,4-bimethyl-2-imidazoline is added in batches in the mixture solution and a thermal polymerization is performed at 130° C. for 8 hours. The molar ratio of the 3% mixture solution to the 2,4-bimethyl-2-imidazoline is 2:1. Here, the metastable state polymer of experimental example 5 is obtained.

Figure 18:
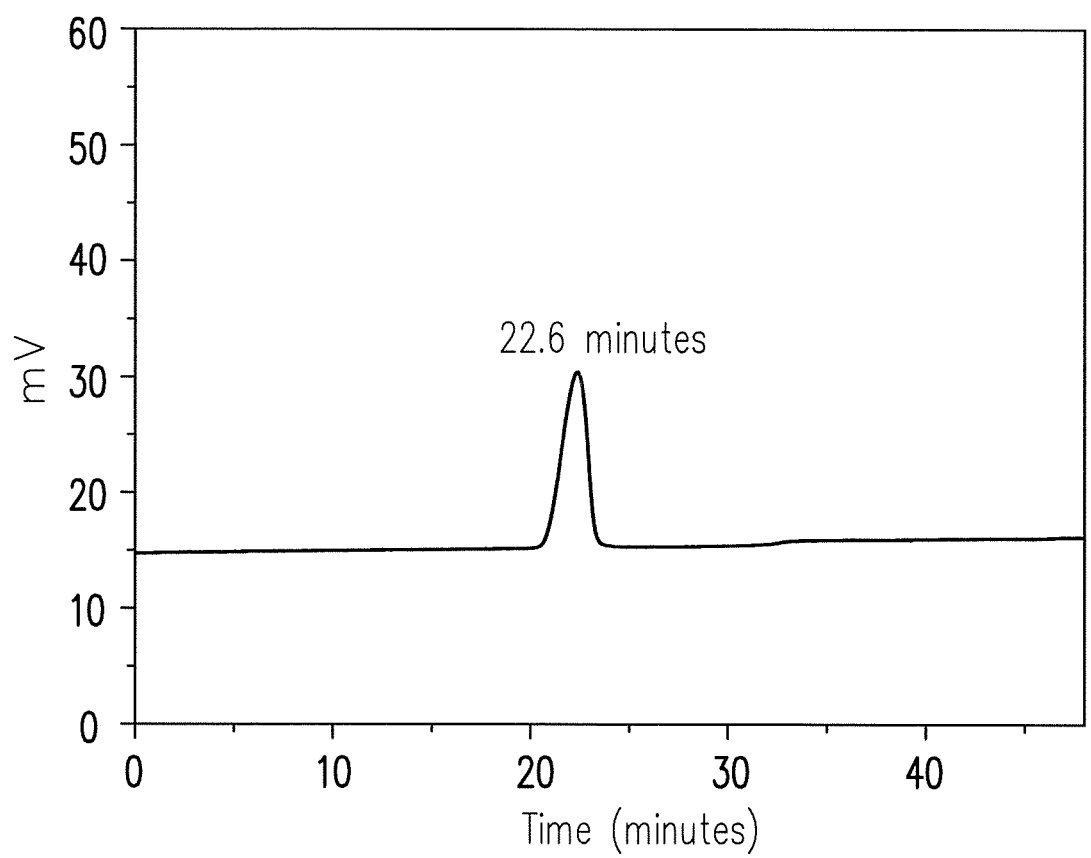
FIG. 18 is a GPC diagram of the metastable state polymer of experimental example 5.

The metastable state nitrogen-containing polymer of experimental example 5 is a polymer with a narrow molecular weight distribution, wherein the GPC peak time is 20.6 minutes, and the PDI of the molecular weight is 1.2, as shown in FIG. 18.

The conductive additive of experimental example 5 is Super P, and the binder is PVDF.

Then, the fabrication of the composite anode of the lithium secondary battery is as described in the fourth exemplary embodiment. The thickness of the fabricated nanoscale coating layer in the composite anode material of the lithium secondary battery is about 5 nm to 10 nm. Then, the anode and a $LiCoO_2$ cathode, in conjunction with a regular electrolyte solution (1.1M $LiPF_6$ EC/EMC/DEC), are assembled into a full cell. The full cell is charged at 0.2 C and discharged at 0.5 C at room temperature under the voltage condition of 2.8V-4.3V. The curve diagram of FIG. 12 between battery cycle life and discharge capacity is obtained.

Comparative Example 5

Moreover, uncoated MCMB is used as an anode material, $LiCoO_2$ is used as a cathode material, and a regular electrolyte solution (1.1M $LiPF_6$ EC/EMC/DEC) is used in conjunction. Similarly, at room temperature and under the same voltage condition of 2.8V-4.3V, the battery is charged at 0.2 C and discharged at 0.5 C. The result is similarly shown in FIG. 12.

Figure 12:
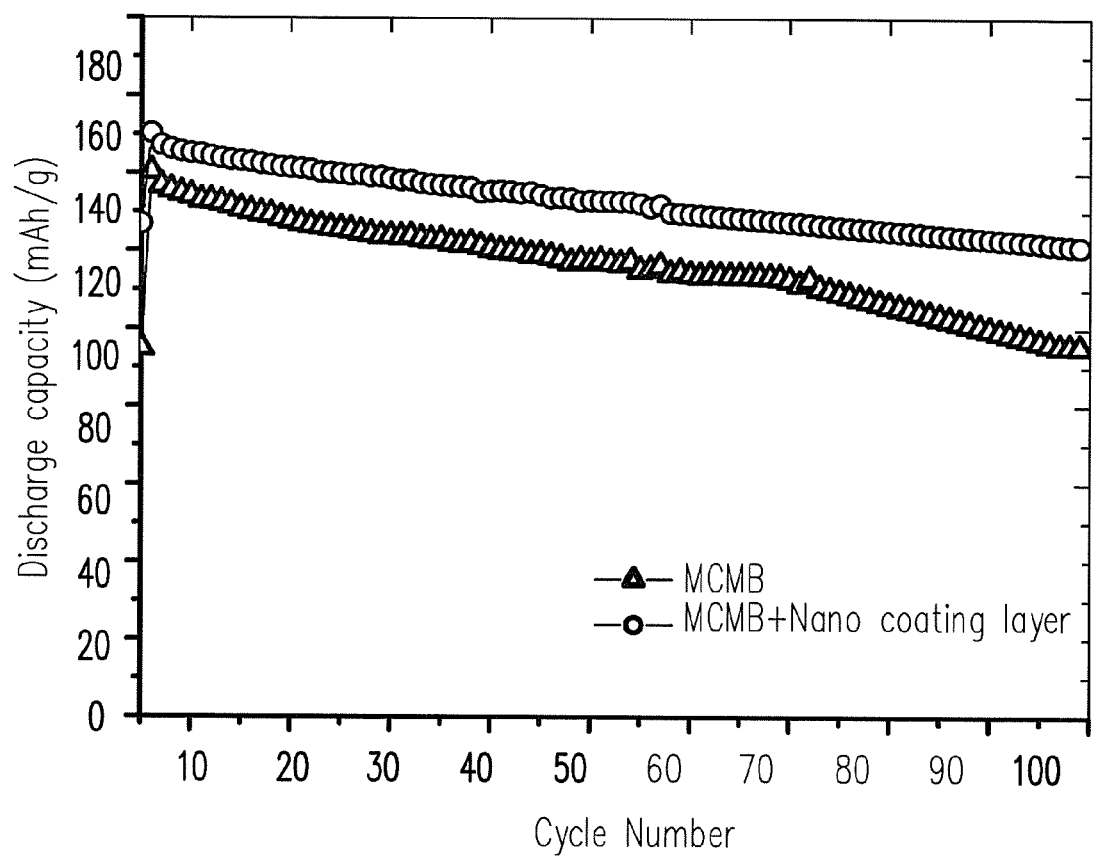
FIG. 12 is a curve diagram of the result of the charge-discharge cycle test of experimental example 5.

It is known from FIG. 12 that, when the cycle number reaches 110, the capacity retention of the battery in which only the anode material has a nanoscale coating layer containing a metastable state polymer is 82%. On the other hand, the capacity retention of the battery where neither the cathode nor the anode has a nanoscale coating layer is only 70%.

Experimental Example 6

First, MGP is fabricated and used as an anode active material. Then, the MGP anode active material with 0.5% added metastable state polymer (concentration ratio with respect to the anode) is stirred in a planetary-type mixing machine or a regular machine for 3 to 10 minutes. A nanoscale layer of 1 to 30 nm is then coated. The metastable state polymer of the present experimental example is the same as the metastable state polymer of experimental example 5.

Figure 13:
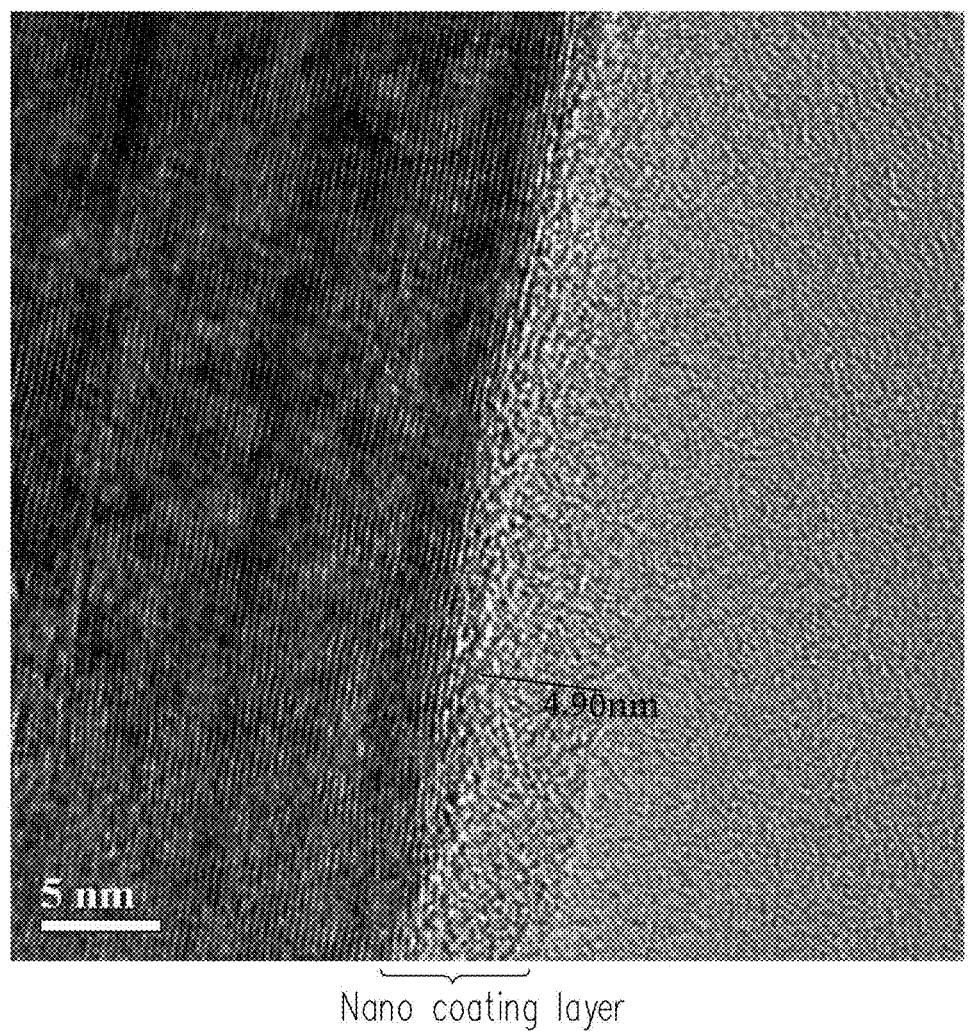
FIG. 13 is a TEM image of the composite cathode material of the lithium secondary battery fabricated in experimental example 6.

By using TEM to observe the obtained composite anode active material of the lithium secondary battery, the TEM image of FIG. 13 may be obtained. The TEM image shows that the surface of the cathode active powder does have a nanoscale coating layer, wherein the thickness is about 5 nm to 10 nm.

Embodiment 7

First, the composite $LiCoO_2$ is fabricated and used as a cathode material and a lithium metal is used as an anode. A regular electrolyte solution (1.1M $LiPF_6$ EC/EMC/DEC) is used in conjunction. The weight ratios of the metastable state polymer to all of the anode materials are 1% (test one) and 0.5% (test two). The metastable state polymer is directly coated on the cathode material by a mixing method.

The metastable state polymer of experimental example 7 is formed by dissolving 4,4'-diphenylsulfone bismaleimide and 2,2-bis(4-(p-maleimidophenoxy)-phenyl)-hexafluoropropane in EC/PC at a molar ratio of 4:1 to form a 3% mixture solution. Then, 2,4-bimethyl-2-imidazoline is added in batches in the mixture solution and a thermal polymerization is performed at 130° C. for 8 hours. The molar ratio of the 3% mixture solution to the 2,4-bimethyl-2-imidazoline is 2:1. Here, the metastable state polymer of experimental example 7 is obtained.

Figure 19:
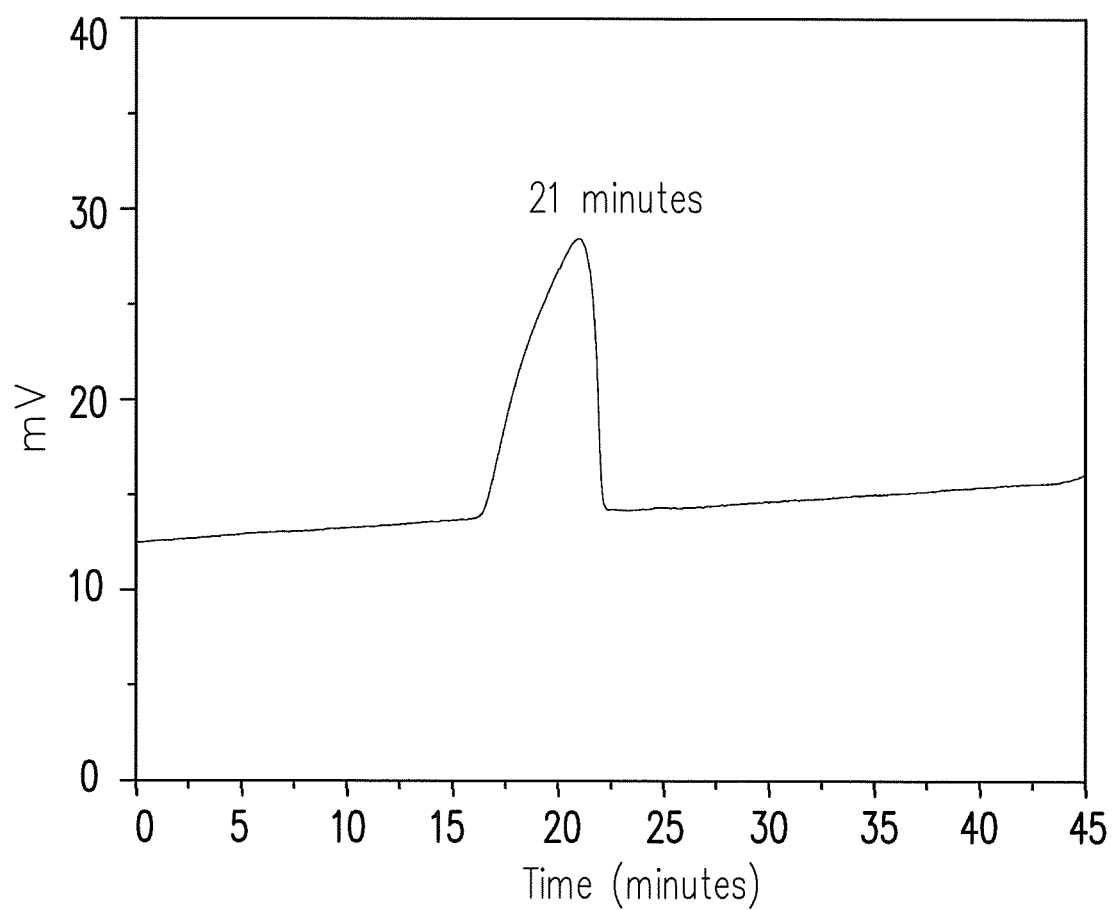
FIG. 19 is a GPC diagram of the metastable state polymer of experimental example 7.

The metastable state nitrogen-containing polymer of experimental example 7 is a polymer with a narrow molecular weight distribution, wherein the GPC peak time is 21 minutes and the PDI of the molecular weight is 1.6, as shown in FIG. 19.

Figure 14:
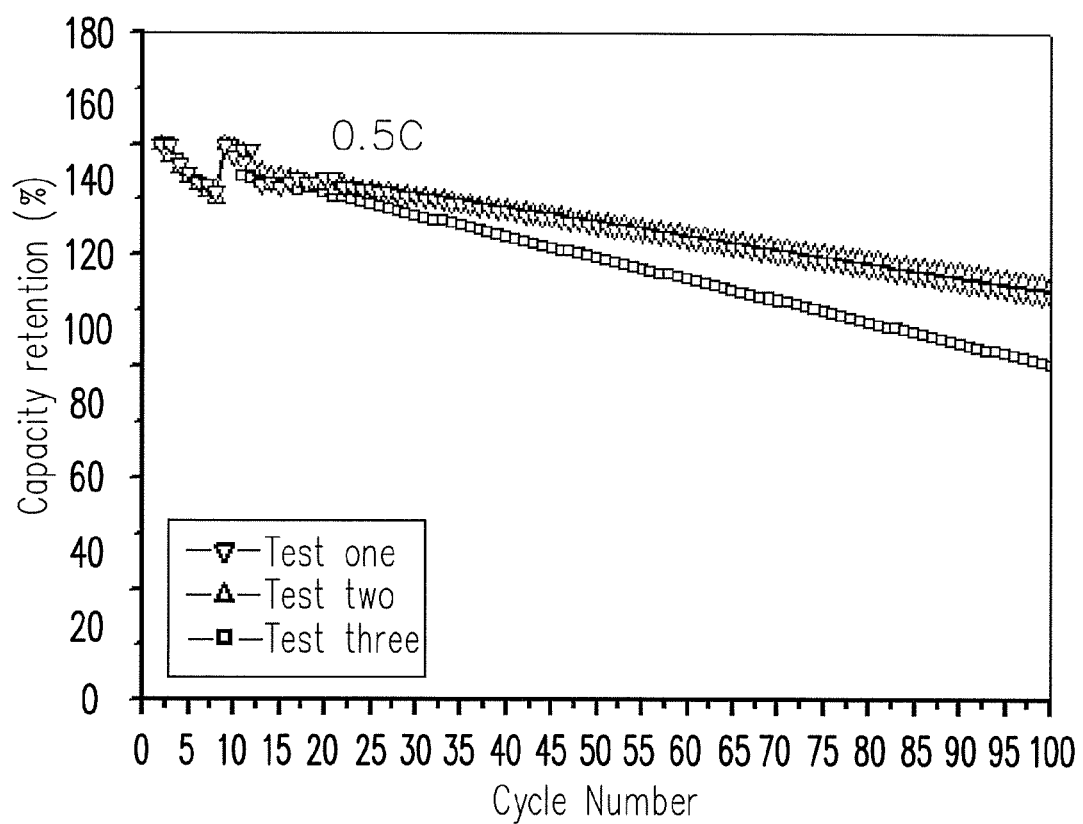
FIG. 14 is a curve diagram of the result of the charge-discharge cycle test of experimental example 7.

Then, as shown in FIG. 14, a capacity test of battery cycle life is conducted on the composite cathode material of the lithium secondary battery fabricated using the above method at high temperature (about 55° C.) and a voltage of 2.8V-

4.3V. The result shows that a certain amount of capacity is still retained when the cycle number reaches 100, indicating a retention rate greater than 80%.

Comparative Example 6

Moreover, using an uncoated $LiCoO_2$ cathode material, a capacity test of battery cycle life is conducted under the same temperature condition as experimental example 7 and a normal voltage range of 2.8V-4.3V. The result is similarly shown in FIG. 14 (test three), and it is seen that the capacity thereof is much lower compared to test one. Further using the uncoated cathode material, the result shows that when the cycle number reaches 100, the capacity is decreased significantly and the retention rate of the capacity is only 60%.

It is known from FIG. 14 that, when the charging voltage is increased from 4.2V to 4.3V, the composite $LiCoO_2$ cathode material of the lithium secondary battery containing a coated nanoscale coating layer has an apparently stable cycle life and a significantly increased energy density.

Embodiment 8

Figure 15:
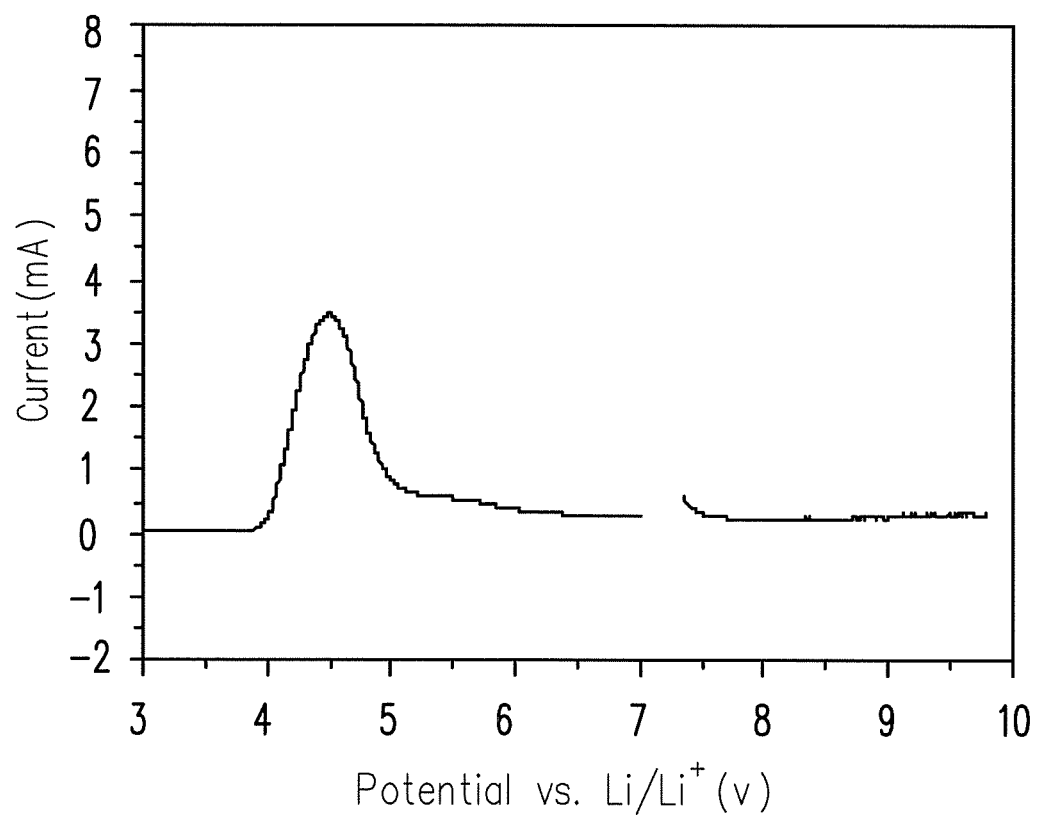
FIG. 15 is a curve diagram of the decomposition potential of the electrolyte solution of experimental example 8.

Using a coin battery (size CR2032), an electrochemical linear sweep voltage (LSV) test is conducted, wherein the battery cathode uses the composite $LiCoO_2$ cathode of experimental example 7, the anode is a lithium metal, and the separator is a PP/PE/PP triple-layer film. The electrolyte solution is formed by dissolving 1.1M of $LiPF_6$ in EC/DEC/EMC. The linear sweep potential ranges from 3V to 9V, and the scan rate is 0.5 mv/s. It is observed that the decomposition potential of the electrolyte solution of the lithium secondary battery having a composite cathode is greater than 9V, as shown in FIG. 15.

Embodiment 9

Using a coin battery (size CR2032), an electrochemical linear sweep voltage (LSV) test is conducted, wherein the battery cathode uses a coated composite $LiNi_4Co_4Mn_2O_2$ cathode, the anode is a lithium metal, and the separator is a PP/PE/PP triple-layer film. The electrolyte solution is formed by dissolving 1.1M of $LiPF_6$ in EC/DEC/EMC.

The metastable state polymer of experimental example 9 uses the metastable state polymer of experimental example 1.

Figure 16:
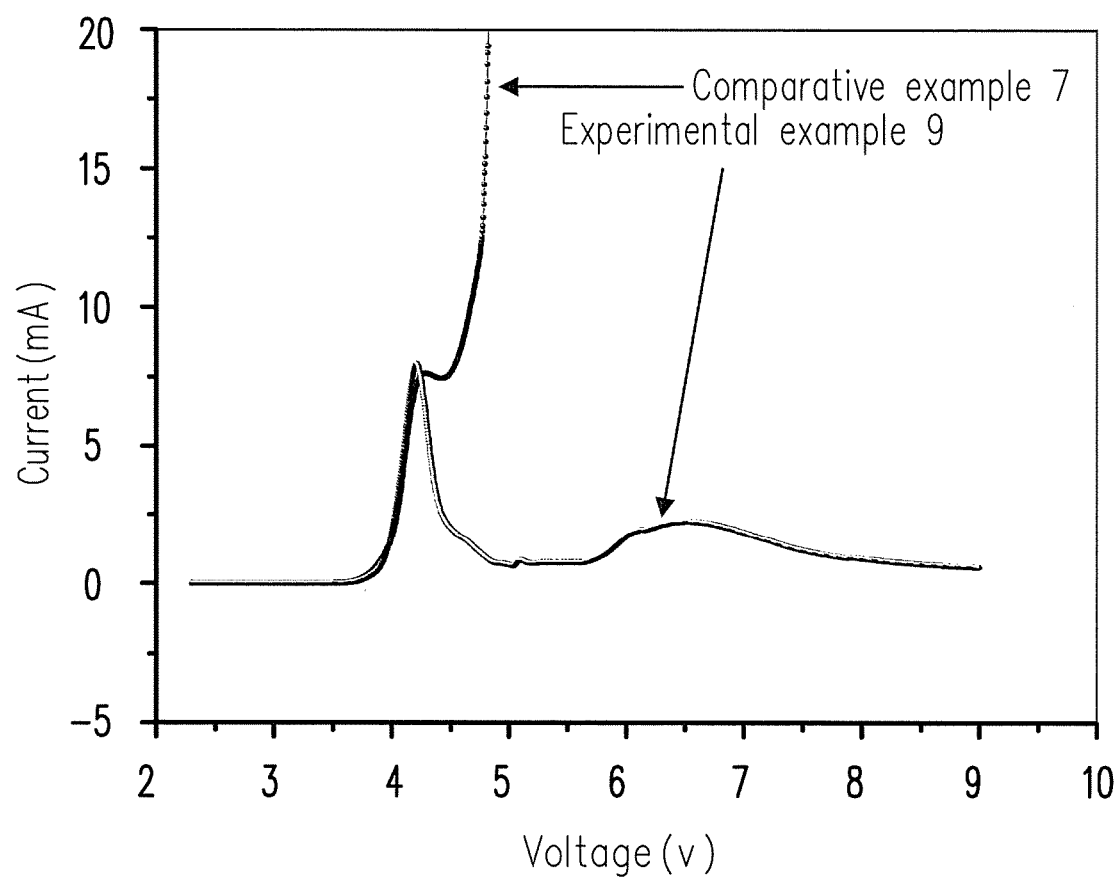
FIG. 16 is a curve diagram of the decomposition potential of the electrolyte solution of each of comparative example 7 and experimental example 9.

The linear sweep potential ranges from 3V to 9V, and the scan rate is 0.5 mv/s. It is observed that the decomposition potential of the electrolyte solution of the lithium secondary battery having a composite cathode is greater than 5.7V, as shown in FIG. 16.

Comparative Example 7

Using a button cell (size CR2032), an electrochemical linear sweep voltage (LSV) test is conducted, wherein the battery cathode uses an uncoated $LiNi_4Co_4Mn_2O_2$ electrode, the anode is a lithium metal, and the separator is a PP/PE/PP triple-layer film. The electrolyte solution is framed by dissolving 1.1M of $LiPF_6$ in EC/DEC/EMC. The linear sweep potential ranges from 3V to 9V, and the scan rate is 0.5 mv/s. It is seen that the decomposition potential of the electrolyte solution of comparative example 7 is only 5.7V, as shown in FIG. 16.

Since the existence of the nanoscale coating layer also significantly increases the decomposition voltage of the electrolyte solution, decomposition of the electrolyte solution in a high voltage environment is avoided.

Based on the above, regarding the composite electrode material of a lithium secondary battery and the lithium secondary battery, the nanoscale coating layer formed on the cathode surface may decrease the extend of reaction resulting from the direct contact between the electrolyte solution and the electrode, which may effectively improve the electrode performance, and may also increase the operating voltage so as to increase the energy density of the battery. The nanoscale coating layer formed on the anode effectively improves the compatibility between the electrode and the electrolyte solution, and therefore the destructive insertion of the high-polarity solvent in the anode material is suppressed. Overall, the cycle life at high temperature is effectively increased, the capacity retention is significantly increased, and the fabrication process is simple and may reduce costs.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A composite electrode material of a lithium secondary battery, comprising:
an electrode active powder, and
a nanoscale coating layer coated on a surface of the electrode active powder, wherein the nanoscale coating layer is formed from a metastable state polymer, the metastable state polymer is produced from a reaction of a compound A and a compound B, the compound A is a monomer having a reactive terminal functional group, the compound B is a heterocyclic amino aromatic derivative used as an initiator, and a weight ratio of the nanoscale coating layer to the composite electrode material of the lithium secondary battery is 0.005% to 10%,
wherein the compound B is represented by one of Formula (1) to Formula (9):

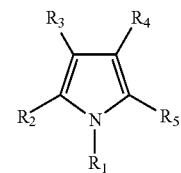

(1)

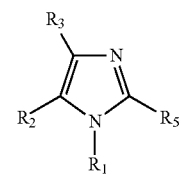

(2)

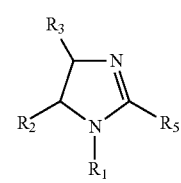

(3)

(4)
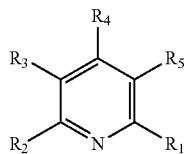

(5)
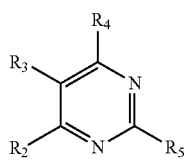

(6)
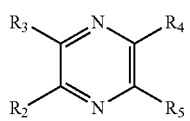

(7)
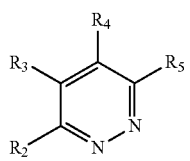

(8)
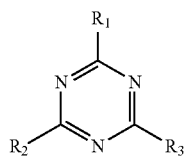

(9)
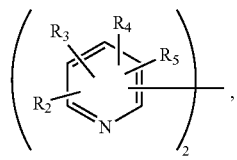

wherein $R_1$ is hydrogen, alkyl, alkyl alkenyl, phenyl, dimethylamino, or —$NH_2$, and $R_2$, $R_3$, $R_4$, and $R_5$ are each independently hydrogen, alkyl, alkyl alkenyl, halo, or —$NH_2$, wherein the compound A is represented by one or a combination of Formula (10) to Formula (13):

(10)
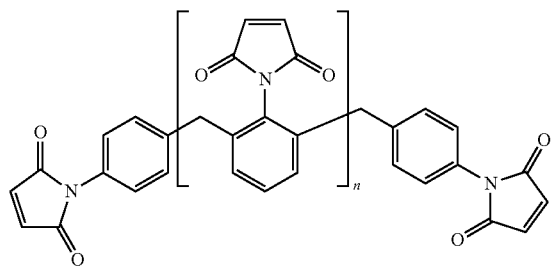

(11)
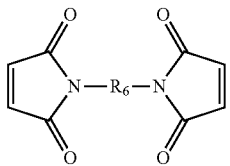

(12)
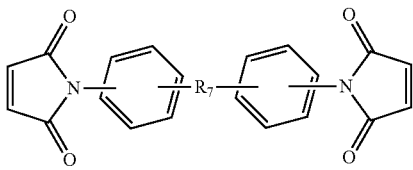

(13)
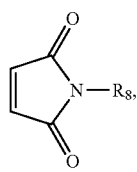

wherein n is an integer between 0 and 4:

$R_6$ is —$RCH_2R'$—, —$RNHR$—, —$C(O)CH_2$—, —$R'O$-$R''OR'$—, —$CH_2OCH_2$—, —$C(O)$—, —$O$—, —$O$—$O$—, —$S$—, —$S$—$S$—, —$S(O)$—, —$CH_2S(O)CH_2$—, —$(O)S(O)$—, —$C_6H_4$—, —$CH_2(C_6H_4)CH_2$—, —$CH_2(C_6H_4)(O)$—, —$C_2H_4$—$(NC_2H_4)$—$C_2H_4$, a siloxane group, biphenylenyl, substituted phenylene, or substituted biphenylenyl, R is $C_{1-4}$ alkylene, R' is $C_{1-4}$ alkylene, biphenylenyl, or substituted biphenylenyl, and R" is $C_{1-4}$ alkylene, —$C_6H_4$—$C(CF_3)_2$—$C_6H_4$—, biphenylenyl, or substituted biphenylenyl:

$R_7$ is —$RCH_2$—, —$CH_2$—$(O)$—, —$C(CH_3)_2$—, —$O$—, —$O$—$O$—, —$S$—, —$S$—$S$—, —$(O)S(O)$—, $C(CF_3)_2$—, or —$S(O)$—, wherein R is $C_{1-4}$ alkylene; and $R_8$ is hydrogen, $C_{1-4}$ alkyl, phenyl, benzyl, cyclohexyl, sulfonyl hydroxide, —$C_6H_4CN$, N-methoxycarbonyl, —$(C_6H_4)$—$O(C_2H_4O)$—$CH_3$, $C_2H_4$—$(C_2H_4O)_{11}$—$OCH_3$, or —$C(O)CH_3$.

2. The composite electrode material of the lithium secondary battery of claim 1, wherein a molar ratio of the compound A to the compound B is 10:1 to 1:10.

3. The composite electrode material of the lithium secondary battery of claim 2, wherein the compound B is selected from the group consisting of imidazole, imidazole derivative, pyrrole, pyrrole derivative, pyridine, 4-tert-butylpyridine, 3-butylpyridine, 4-dimethylaminopyridine, 2,4,6-triamino-1,3,5-triazine, 2,4-bimethyl-2-imidazoline, pyridazine, pyrimidine, and pyrazine.

4. The composite electrode material of the lithium secondary battery of claim 1, wherein the electrode active powder comprises a cathode material.

5. The composite electrode material of the lithium secondary battery of claim 4, wherein a thickness of the nanoscale coating layer is between 1 nm and 30 nm.

6. The composite electrode material of the lithium secondary battery of claim 4, wherein the cathode material is selected from the group consisting of lithiated oxide, lithiated sulfide, lithiated selenide, lithiated telluride of vanadium, titanium, chromium, copper, molybdenum, niobium, iron, nickel, cobalt, and manganese, and a combination thereof.

7. The composite electrode material of the lithium secondary battery of claim 4, wherein the cathode material comprises $LiMn_2O_4$, $LiNi_xCo_yO_2$, $LiCoO_2$, $LiFePO_4$, $LiNi_xCo_yMnO_2$, or $LiNi_xMn_yO_2$.

8. The composite electrode material of the lithium secondary battery of claim 1, wherein the electrode active powder comprises an anode material.

9. The composite electrode material of the lithium secondary battery of claim 8, wherein a thickness of the nanoscale coating layer is between 1 nm and 30 nm.

10. The composite electrode material of the lithium secondary battery of claim 8, wherein the anode material is selected from the group consisting of mesocarbon microbeads (MCMB), mesophase graphite powder (MGP), vapor-grown carbon fiber (VGCF), carbon nanotube (CNT), coke, carbon black, natural graphite, artificial graphite, acetylene black, carbon fiber, glassy carbon, a lithium alloy, and a combination thereof.

11. A lithium secondary battery, at least comprising:
- at least one electrode material, wherein the electrode material is the composite electrode material of the lithium secondary battery of claim 1;
- a non-aqueous electrolyte solution, in contact with the electrode material, wherein the non-aqueous electrolyte solution comprises a non-aqueous solvent and lithium salt; and
- a separator, located in the non-aqueous electrolyte solution.

12. A composite electrode material of a lithium secondary battery, comprising:
- an electrode plate, composed of an electrode active powder; and
- a first nanoscale coating layer, coated on a surface of the electrode plate, wherein the first nanoscale coating layer is formed from a first metastable state polymer, the first metastable state polymer is produced from a reaction of a compound A and a compound B, the compound A is a monomer having a reactive terminal functional group, the compound B is a heterocyclic amino aromatic derivative used as an initiator, and a weight ratio of the first nanoscale coating layer to the composite electrode material of the lithium secondary battery is 0.005% to 10%,
wherein the compound B is represented by one of Formula (1) to Formula (9):

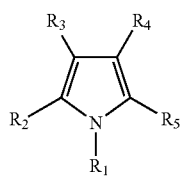
(1)

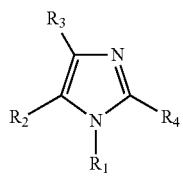
(2)

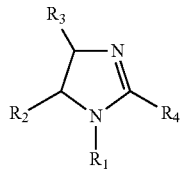
(3)

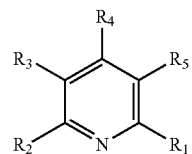
(4)

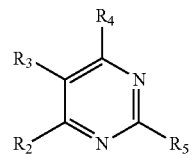
(5)

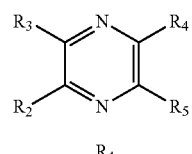
(6)

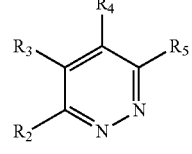
(7)

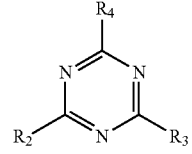
(8)

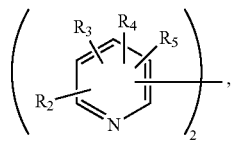
(9)

wherein $R_1$ is hydrogen, alkyl, alkyl alkenyl, phenyl, dimethylamino, or —$NH_2$, and $R_2$, $R_3$, $R_4$, and $R_5$ are each independently hydrogen, alkyl, alkyl alkenyl, halo, or —$NH_2$, wherein the compound A is represented by one or a combination of Formula (10) to Formula (13):

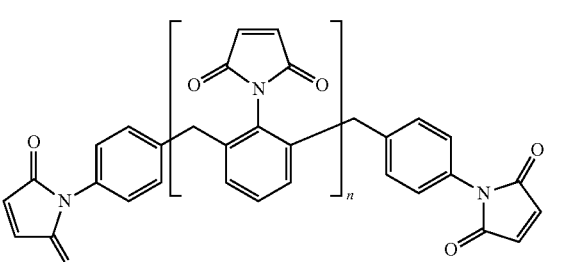
(10)

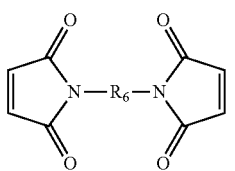
(11)

-continued

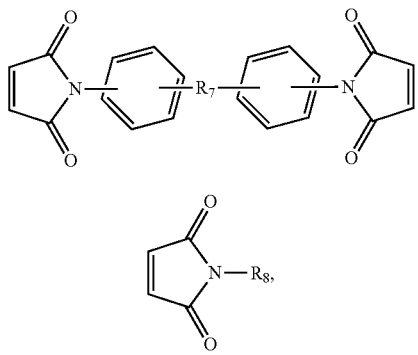

(12)

(13)

wherein n is an integer between 0 and 4;

R is —RCH$_2$R'—, —RNHR—, —C(O)CH$_2$—, —R'O-R"OR'—, —CH$_2$OCH$_2$—, —C(O)—, —O—, —O—O—, —S—, —S—S—, —S(O)—, —CH$_2$S(O)CH$_2$—, —(O)S(O)—, —C$_6$H$_4$—, —CH$_2$(C$_6$H$_4$)CH$_2$—, —CH$_2$(C$_6$H$_4$)(O)—, —C$_2$H$_4$—(NC$_2$H$_4$)—C$_2$H$_4$, a siloxane group, biphenylenyl, substituted phenylene, or substituted biphenylenyl, R is C$_{1-4}$ alkylene, R' is C$_{1-4}$ alkylene, biphenylenyl, or substituted biphenylenyl, and R" is C$_{1-4}$ alkylene, —C$_6$H$_4$—C(CF$_3$)$_2$—C$_6$H$_4$—, biphenylenyl, or substituted biphenylenyl:

R$_7$ is —RCH$_2$—, —CH$_2$—(O)—, —C(CH$_3$)$_2$—, —O—, —O—O—, —S—, —S—S—, —(O)S(O)—, C(CF$_3$)$_2$—, or —S(O)—, wherein R is C$_{1-4}$ alkylene; and R$_8$ is hydrogen, C$_{1-4}$ alkyl, phenyl, benzyl, cyclohexyl, sulfonyl hydroxide, —C$_6$H$_4$CN, N-methoxycarbonyl, —(C$_6$H$_4$)—O(C$_2$H$_4$O)—CH$_3$, C$_2$H$_4$—(C$_2$H$_4$O)$_{11}$—OCH$_3$, or —C(O)CH$_3$.

13. The composite electrode material of the lithium secondary battery of claim 12, wherein the electrode active powder is a powder coated with a second nanoscale coating layer, wherein the second nanoscale coating layer is formed from a second metastable state polymer, the second metastable state polymer is produced from a reaction of the compound A and the compound B, and a weight ratio of the second nanoscale coating layer to the composite electrode material of the lithium secondary battery is 0.005% to 10%.

14. The composite electrode material of the lithium secondary battery of claim 13, wherein a molar ratio of the compound A to the compound B is 10:1 to 1:10.

15. The composite electrode material of the lithium secondary battery of claim 14, wherein the compound B is selected from the group consisting of imidazole, imidazole derivative, pyrrole, pyrrole derivative, pyridine, 4-tert-butylpyridine, 3-butylpyridine, 4-dimethylaminopyridine, 2,4,6-triamino-1,3,5-triazine, 2,4-bimethyl-2-imidazoline, pyridazine, pyrimidine, and pyrazine.

16. The composite electrode material of the lithium secondary battery of claim 12, wherein the electrode active powder comprises a cathode material.

17. The composite electrode material of the lithium secondary battery of claim 16, wherein a thickness of the first nanoscale coating layer is between 1 nm and 30 nm.

18. The composite electrode material of the lithium secondary battery of claim 16, wherein the cathode material is selected from the group consisting of lithiated oxide, lithiated sulfide, lithiated selenide, lithiated telluride of vanadium, titanium, chromium, copper, molybdenum, niobium, iron, nickel, cobalt, and manganese, and a combination thereof.

19. The composite electrode material of the lithium secondary battery of claim 16, wherein the cathode material comprises LiMn$_2$O$_4$, LiNi$_x$Co$_y$O$_2$, LiCoO$_2$, LiFePO$_4$, LiNi$_x$Co$_y$Mn$_z$O$_2$, or LiNi$_x$Mn$_y$O$_2$.

20. The composite electrode material of the lithium secondary battery of claim 12, wherein the electrode active powder comprises an anode material.

21. The composite electrode material of the lithium secondary battery of claim 20, wherein a thickness of the first nanoscale coating layer is between 1 nm and 30 nm.

22. The composite electrode material of the lithium secondary battery of claim 20, wherein the anode material is selected from the group consisting of MCMB, VGCF, CNT, coke, carbon black, natural graphite, artificial graphite, acetylene black, carbon fiber, glassy carbon, a lithium alloy, and a combination thereof.

23. A lithium secondary battery, at least comprising:
at least one electrode material, wherein the electrode material is the composite electrode material of the lithium secondary battery of claim 12;
a non-aqueous electrolyte solution, in contact with the electrode material, wherein the non-aqueous electrolyte solution comprises a non-aqueous solvent and lithium salt; and
a separator, located in the non-aqueous electrolyte solution.

* * * * *